(12) United States Patent
Carragher

(10) Patent No.: US 8,186,575 B2
(45) Date of Patent: May 29, 2012

(54) CONTROLLING CARD-BASED MORTGAGE COMPUTING

(76) Inventor: Philip Carragher, Glencoe, IL (US)

( * ) Notice: Subject to any disclaimer, the term of this patent is extended or adjusted under 35 U.S.C. 154(b) by 957 days.

(21) Appl. No.: 11/368,822

(22) Filed: Mar. 6, 2006

(65) Prior Publication Data

US 2006/0208061 A1 Sep. 21, 2006

Related U.S. Application Data

(60) Provisional application No. 60/660,693, filed on Mar. 11, 2005.

(51) Int. Cl.
*G06Q 40/00* (2012.01)
(52) U.S. Cl. ....................................................... 235/379
(58) Field of Classification Search .................. 235/379; 705/38, 40, 42
See application file for complete search history.

(56) References Cited

U.S. PATENT DOCUMENTS

| | | | | |
|---|---|---|---|---|
| 6,233,566 B1 * | 5/2001 | Levine et al. | ............... | 705/36 R |
| 6,304,860 B1 * | 10/2001 | Martin et al. | ................... | 705/43 |
| 6,663,002 B2 * | 12/2003 | Glaser | ......................... | 705/36 R |
| 7,254,556 B2 | 8/2007 | Fry | | |
| 7,945,510 B1 * | 5/2011 | Bradley et al. | .................. | 705/38 |
| 2002/0188533 A1 * | 12/2002 | Sanchez et al. | ................. | 705/30 |
| 2003/0208439 A1 * | 11/2003 | Rast | ............................... | 705/38 |

* cited by examiner

*Primary Examiner* — Jamara Franklin
(74) *Attorney, Agent, or Firm* — Beem Patent Law Firm

(57) ABSTRACT

An electrical digital computer machine and a data processing system, methods of making and for using the machine, products produced thereby, as well as data structures and articles of manufacture pertaining thereto, and all necessary intermediates of that which is discussed herein, all in the field of computerized aspects of card crediting to mortgages and the like. A computer system applying a card debit to a mortgage, a first computer system enabling a debt to be incurred in connection with usage of a card, such as a debit, credit, or Sharia-compliant card. A second computer system can enabling a mortgage, such as a first mortgage, and apply debit from the card to the mortgage.

20 Claims, 22 Drawing Sheets

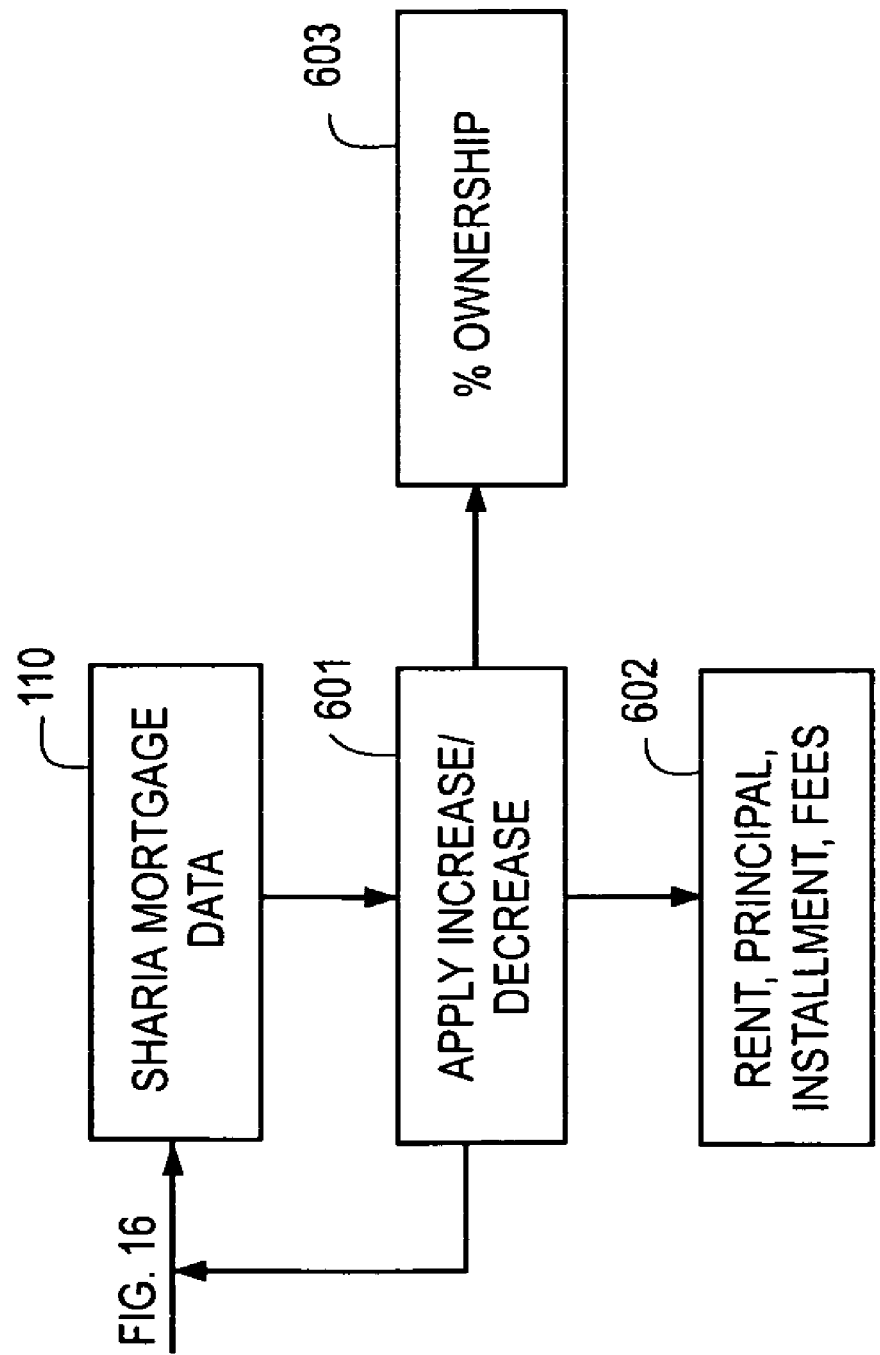

CONTROLLING CARD-BASED MORTGAGE COMPUTING

This patent application claims priority from U.S. patent application Ser. No. 60/660,693 filed by the same inventor on 11 Mar. 2005, incorporated by reference, as well as incorporating by reference U.S. patent application Ser. No. 09/604,696, filed 26 Jun. 2000, and U.S. patent application Ser. No. 09/669,196, filed 25 Sep. 2000.

I. TECHNICAL FIELD

The technical field is computers and data processing systems. Depending on the implementation, there is apparatus, a method for use and method for making, and corresponding products produced thereby, as well as data structures, computer-readable media tangibly embodying program instructions, manufactures, and necessary intermediates of the foregoing, each pertaining to computer-aided aspects of card crediting and debiting to mortgages and the like. More particularly, embodiments can relate to a digital electrical data processing system having particular utility in financial fields related hereto. Still more particularly, embodiments can pertain to card (e.g., charge card, bank card, contactless card, smart card, debit card, etc.) activity-based mortgage crediting, along with automated generation of related documentation, inter-computer communications, and networking.

II. Background Art

The industry has worked long and hard to sell cards. Yet the known prior art has shortcomings that have left many inadequately addressed needs, which the embodiments set forth below are intended to address.

III. Disclosure

In the area of said technical field, representatively, consider a computer system (illustratively representing, for the sake of brevity, methods, articles of manufacture, transmitter, receiver, network implementations, etc.) structured to aid in controlling computing in such exemplary (and not limiting) embodiments as controlling card-based mortgage computing, e.g., first-mortgage computing.

IV. BRIEF DESCRIPTION OF THE DRAWINGS

Figure 1:
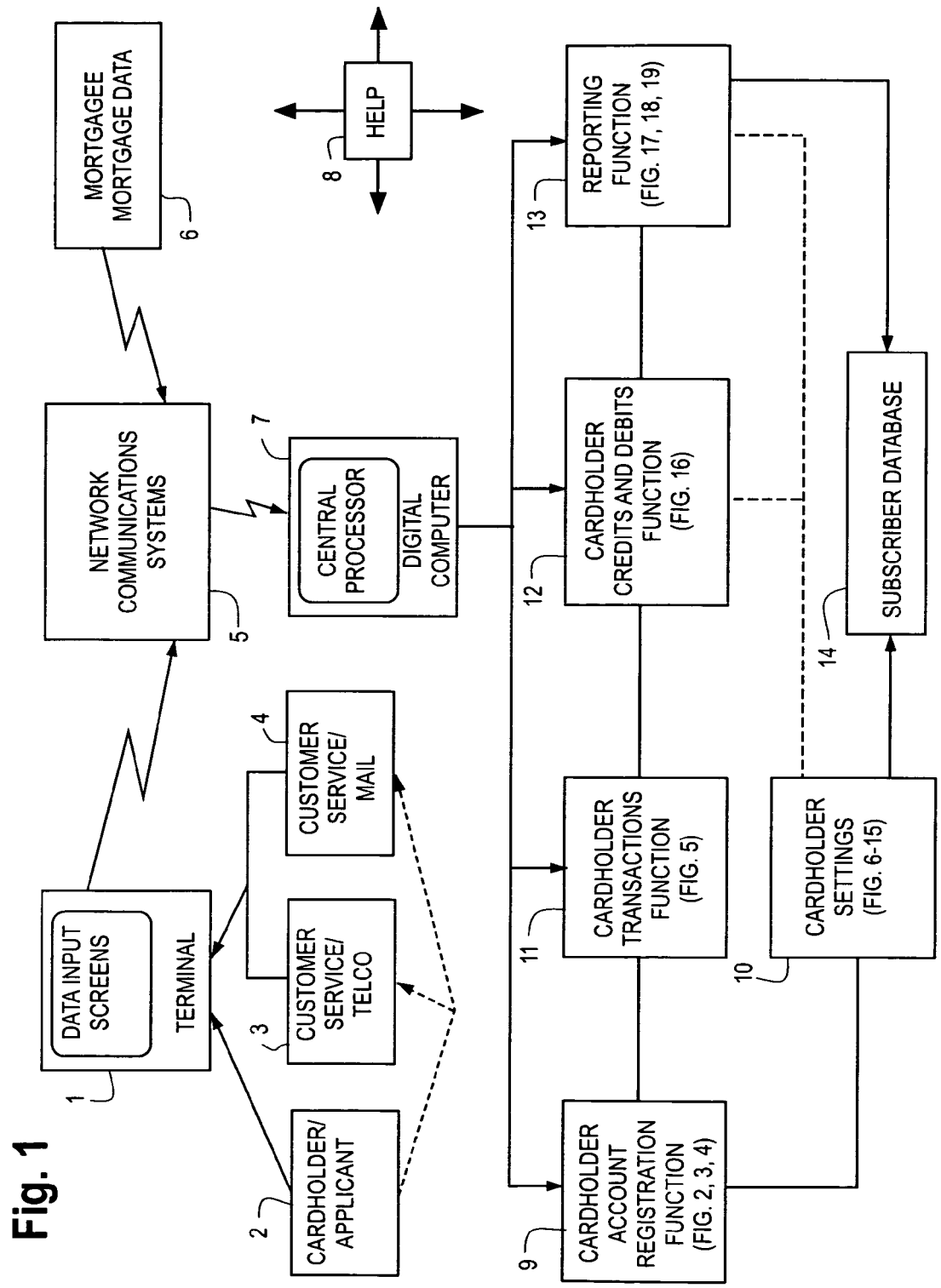
Figure 2:
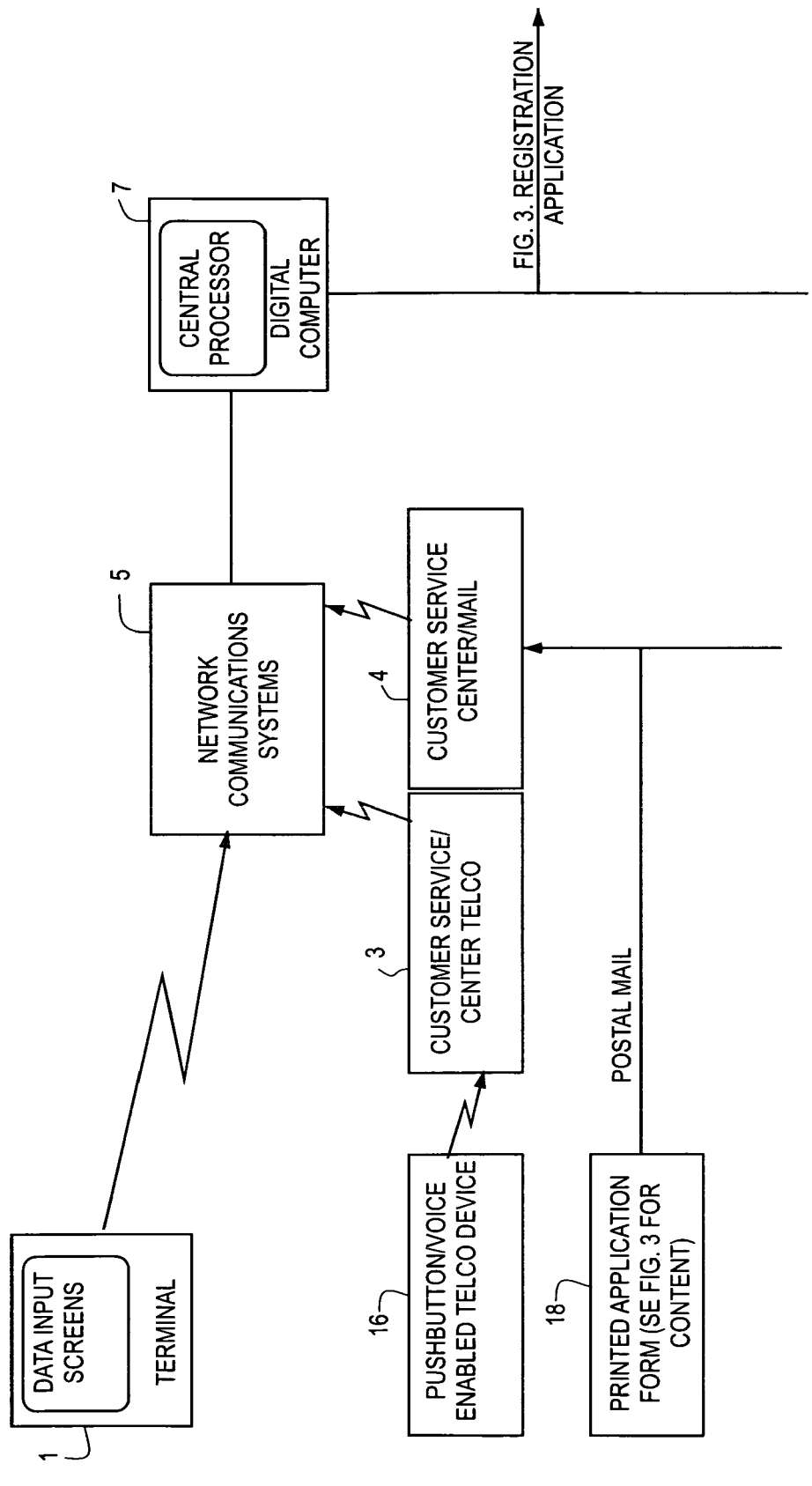
Figure 3:
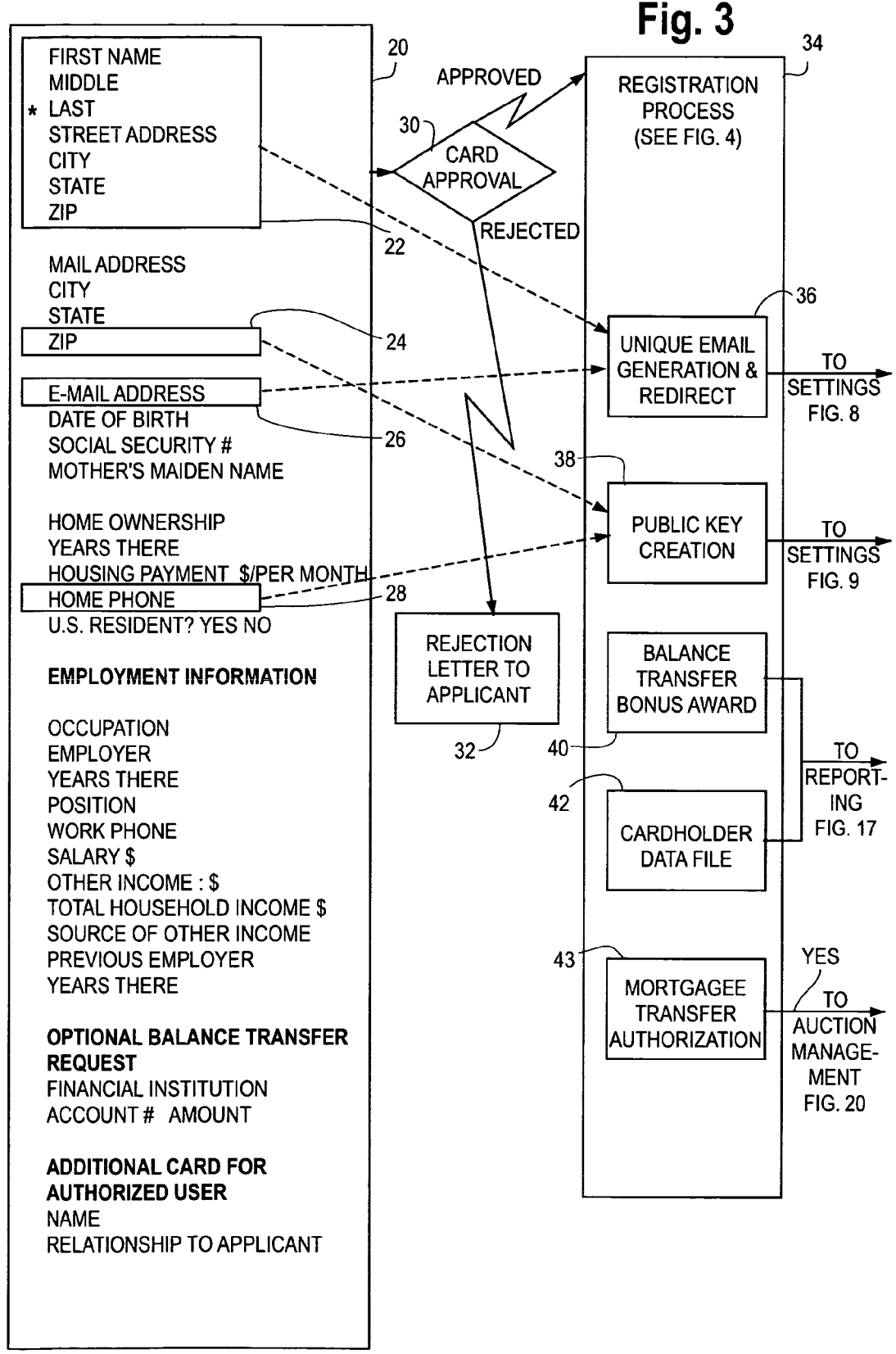
Figure 4:
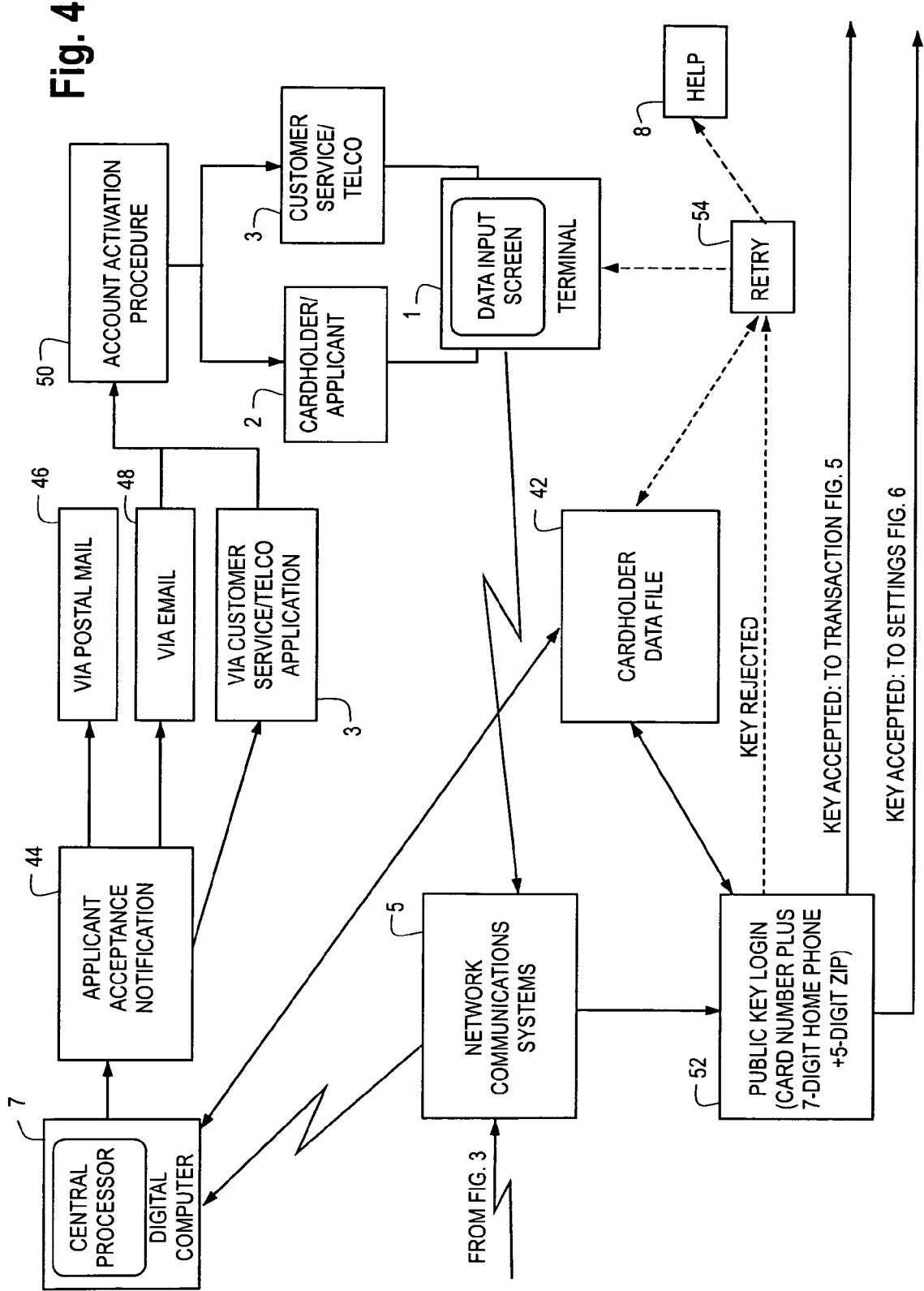
Figure 5:
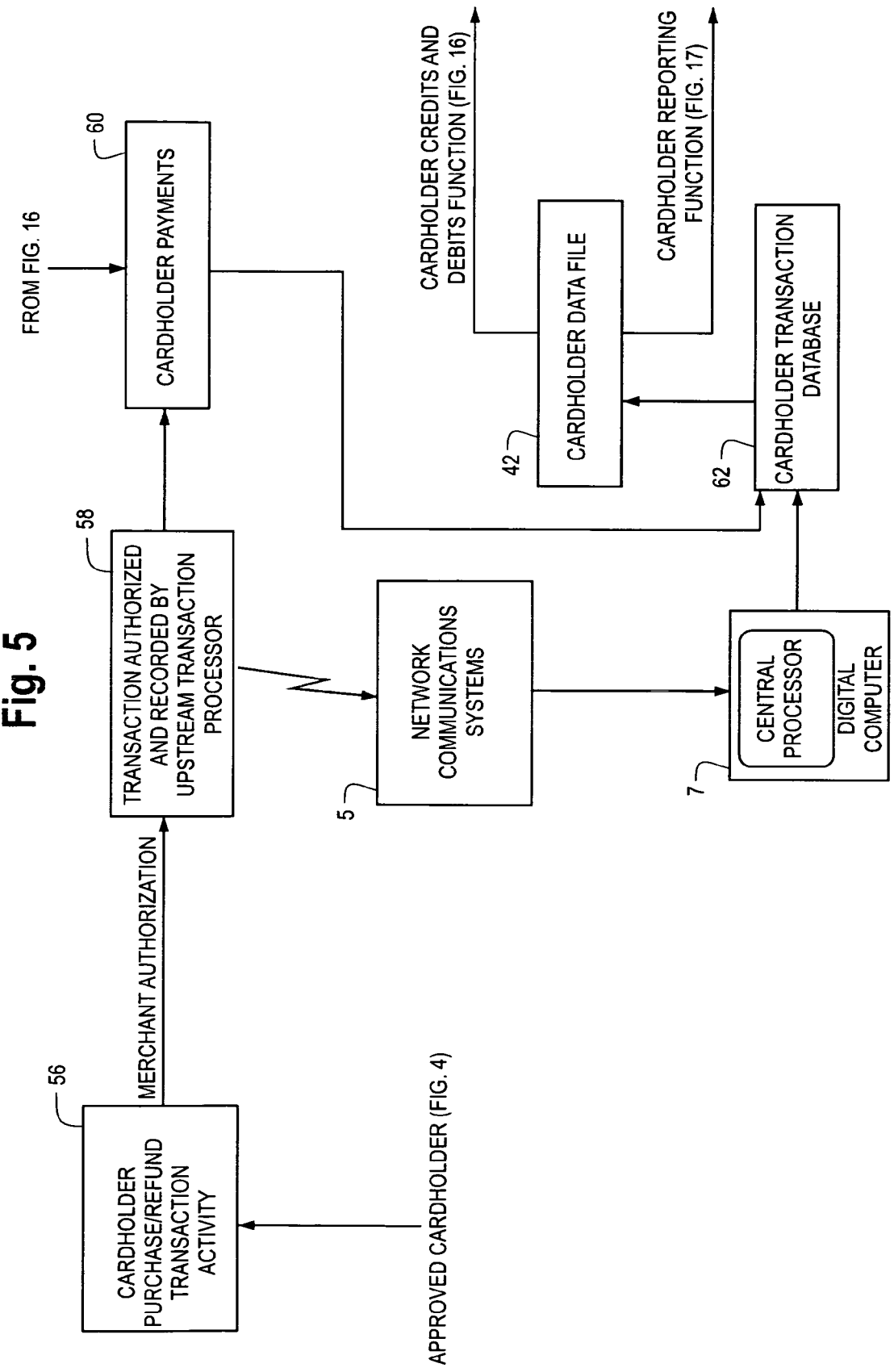
Figure 6:
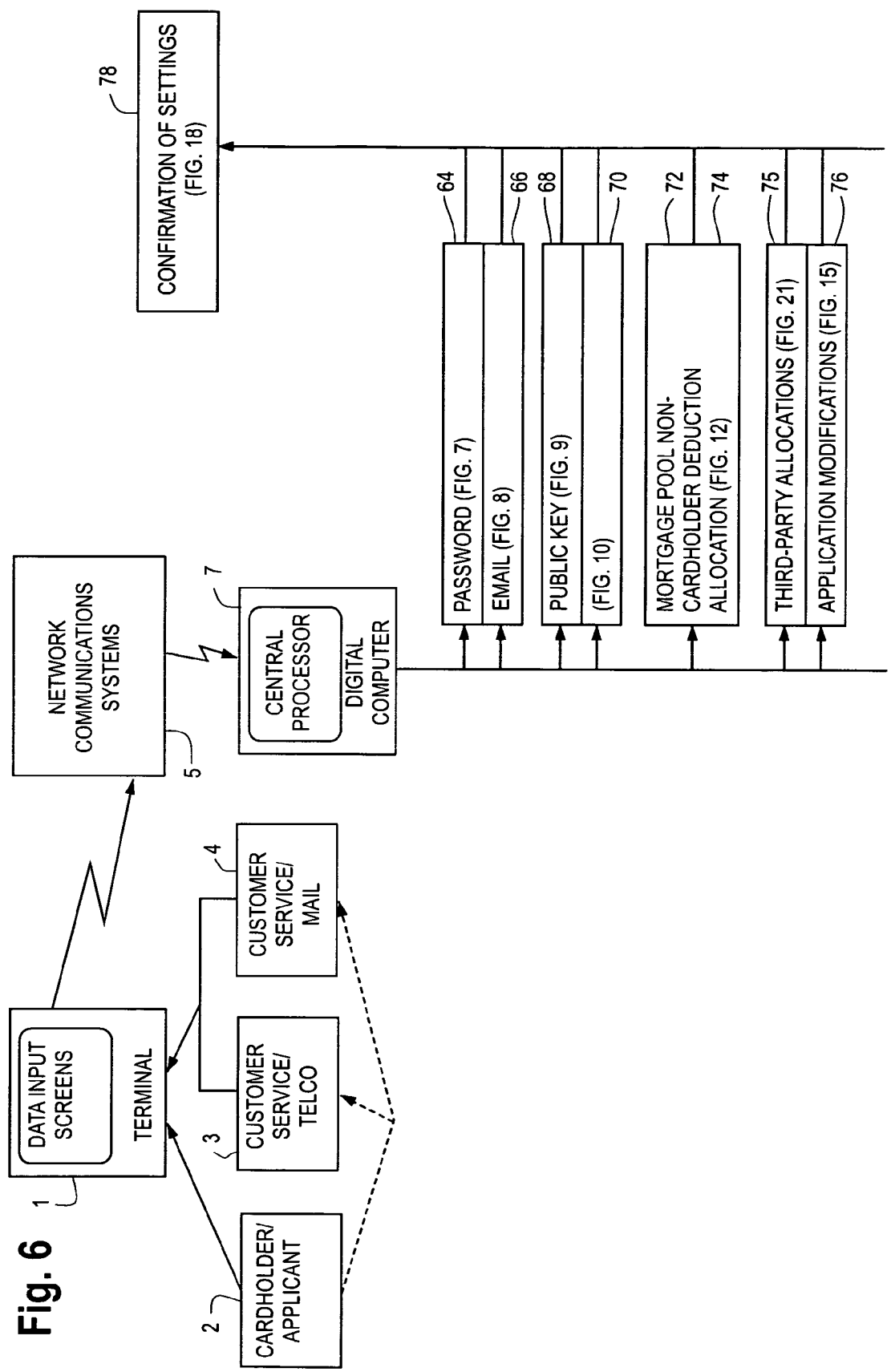
Figure 7:
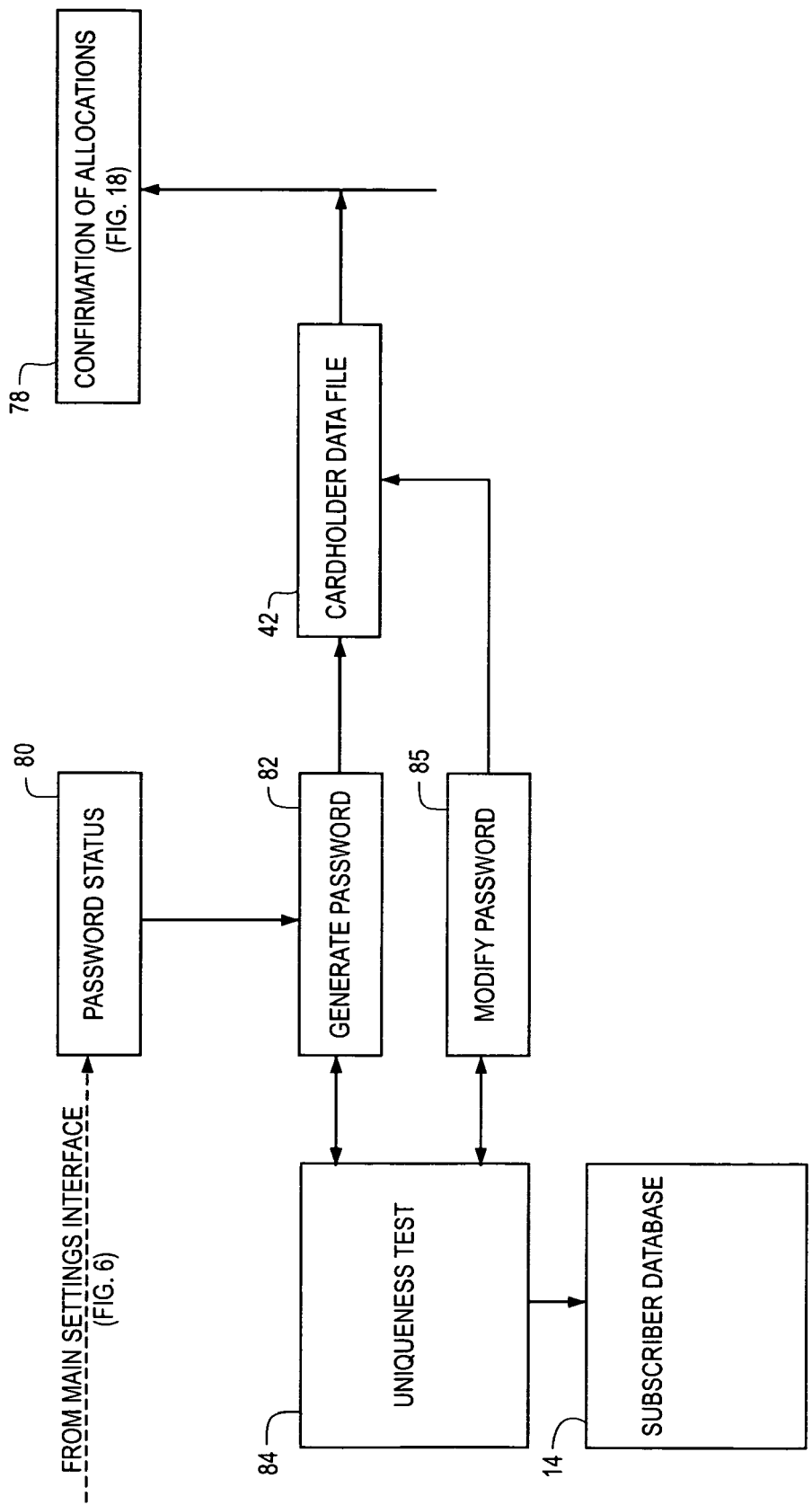
Figure 8:
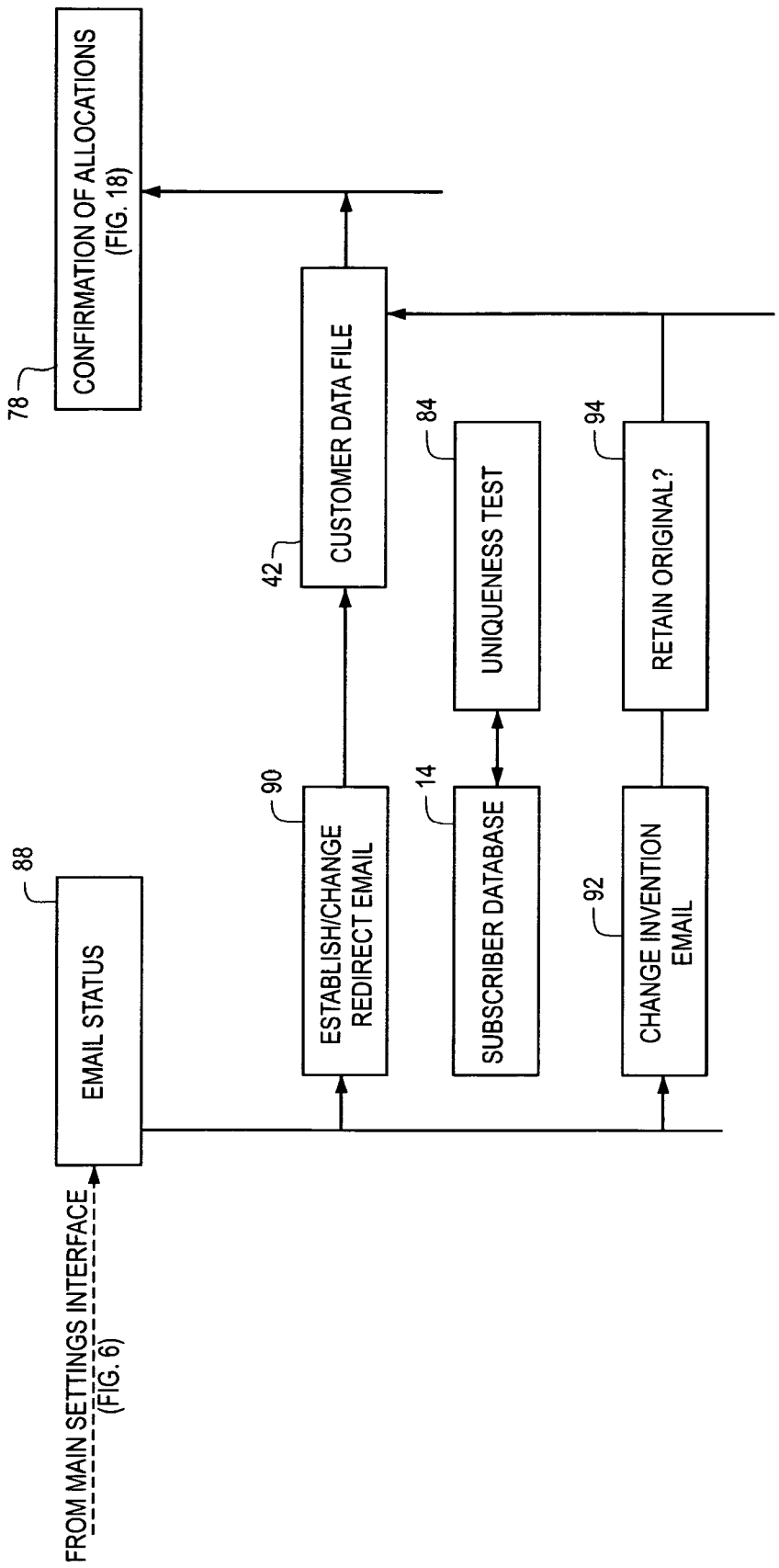
Figure 9:
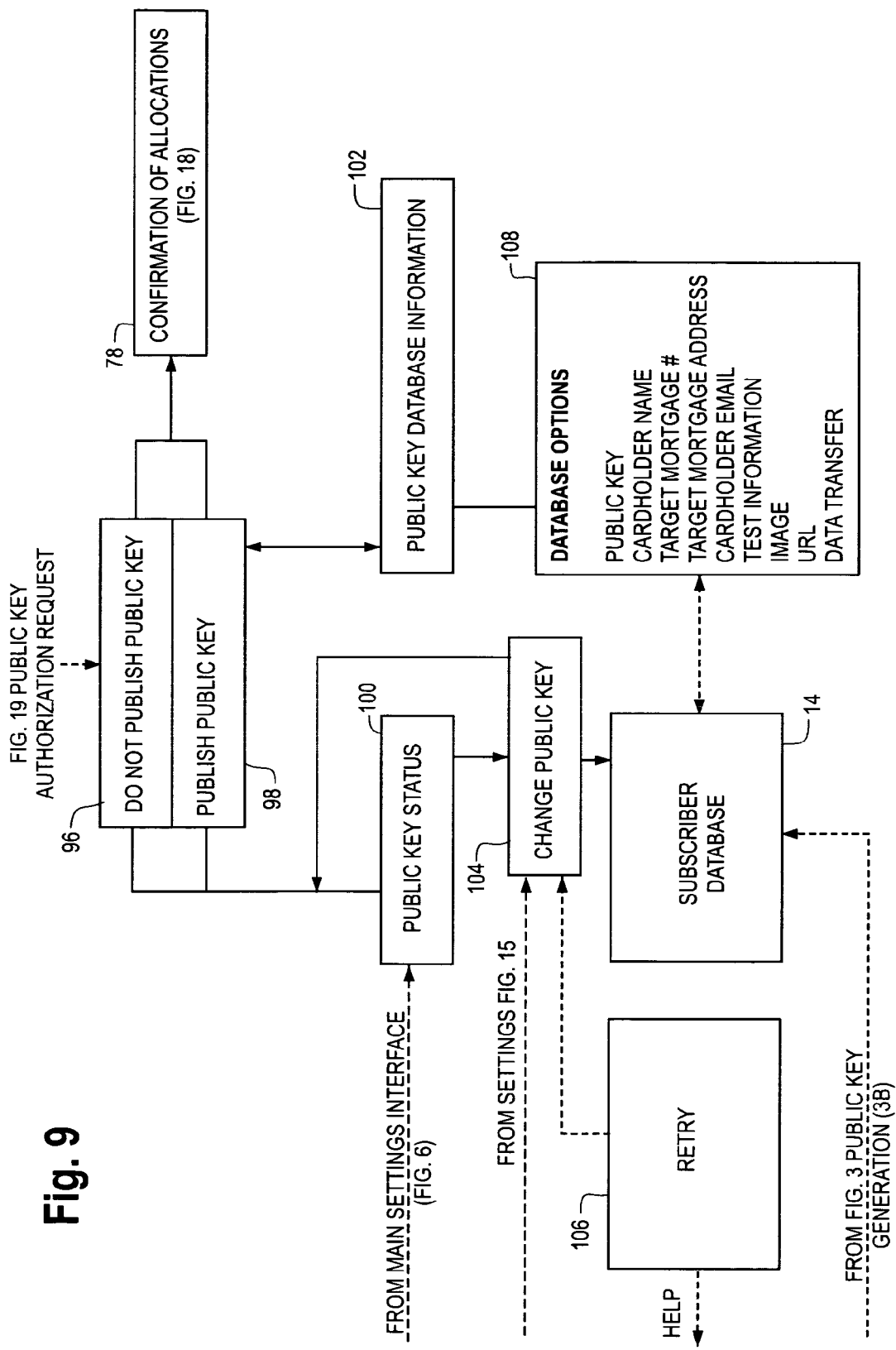
Figure 10:
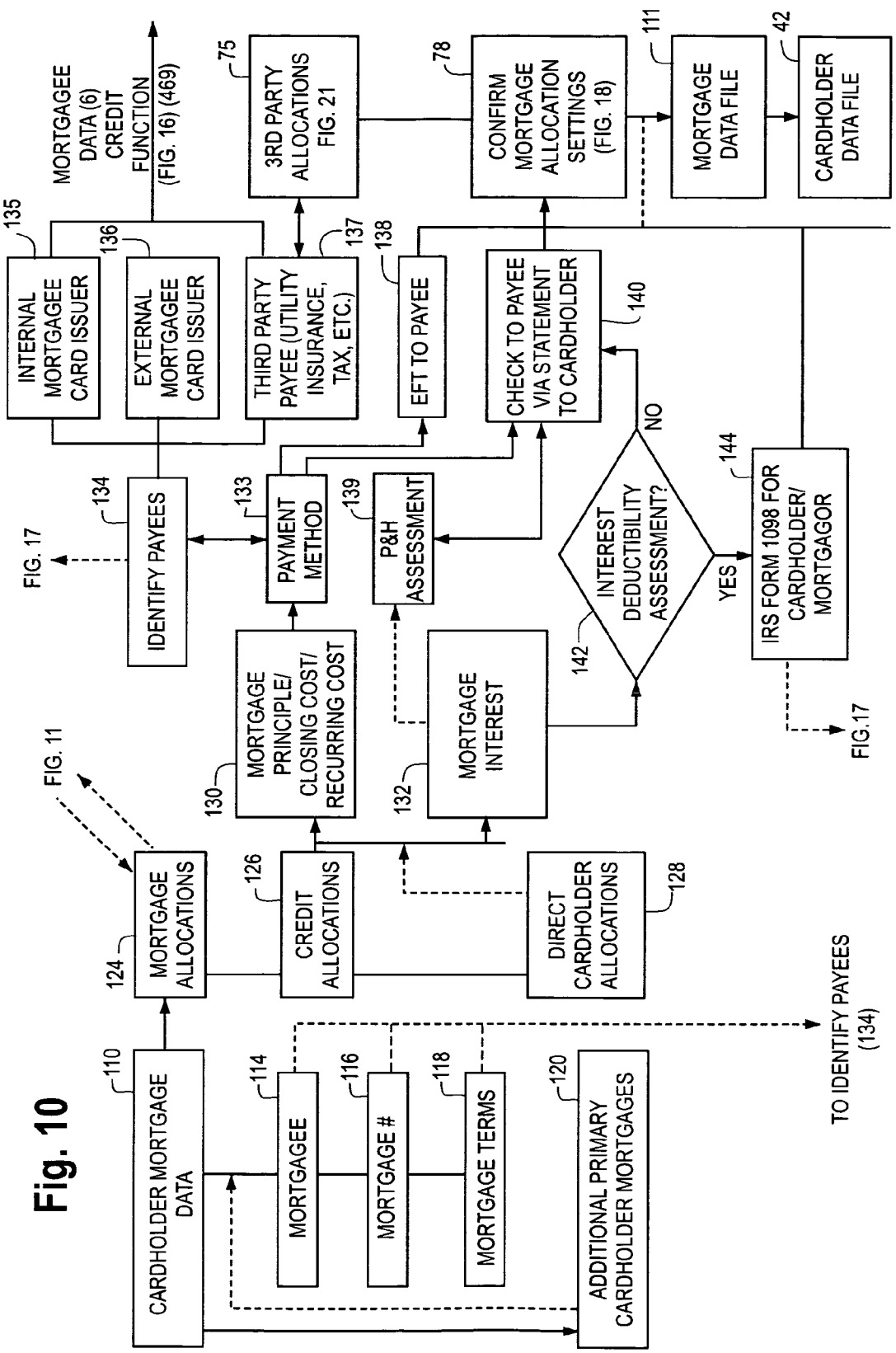
Figure 11:
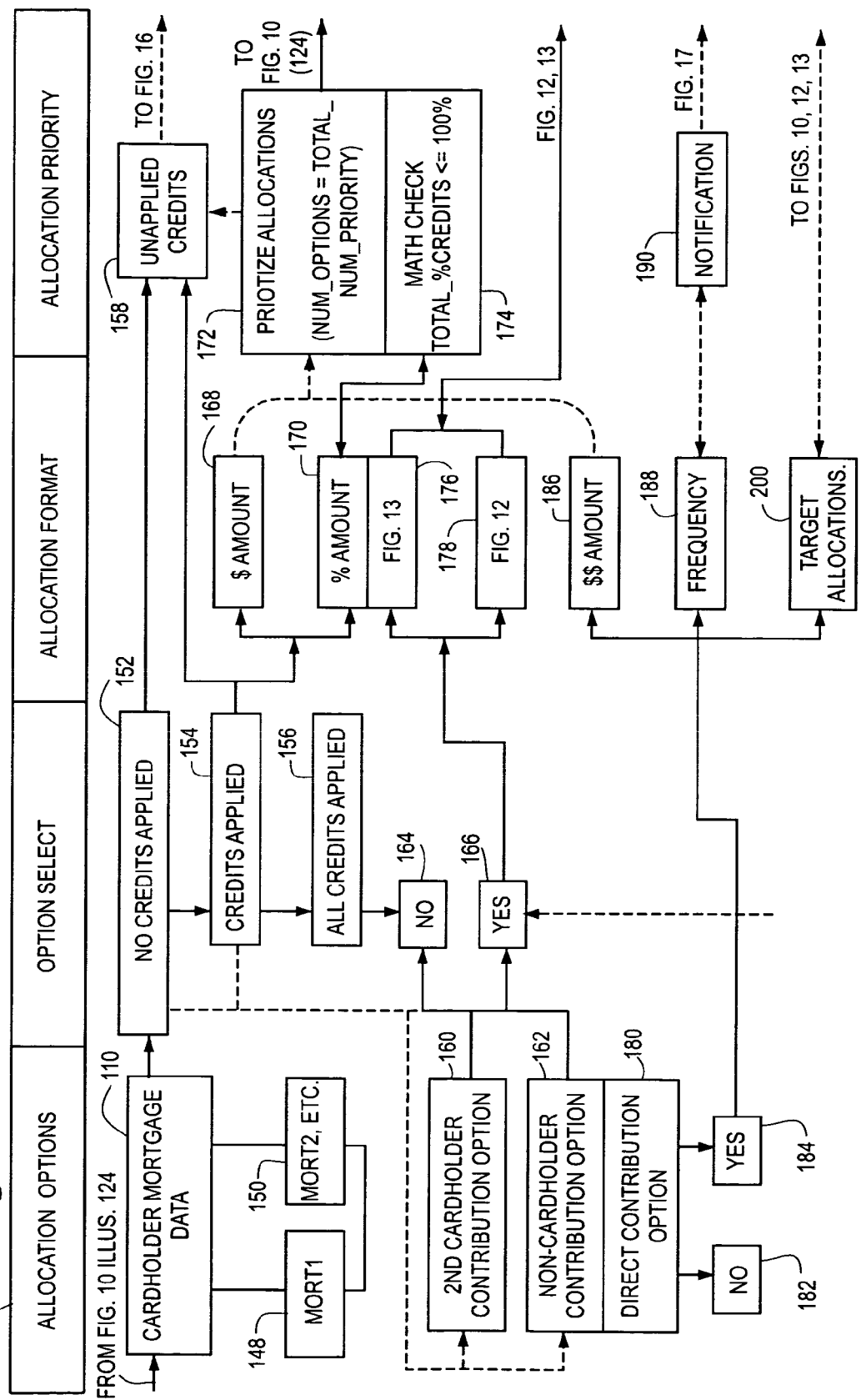
Figure 12:
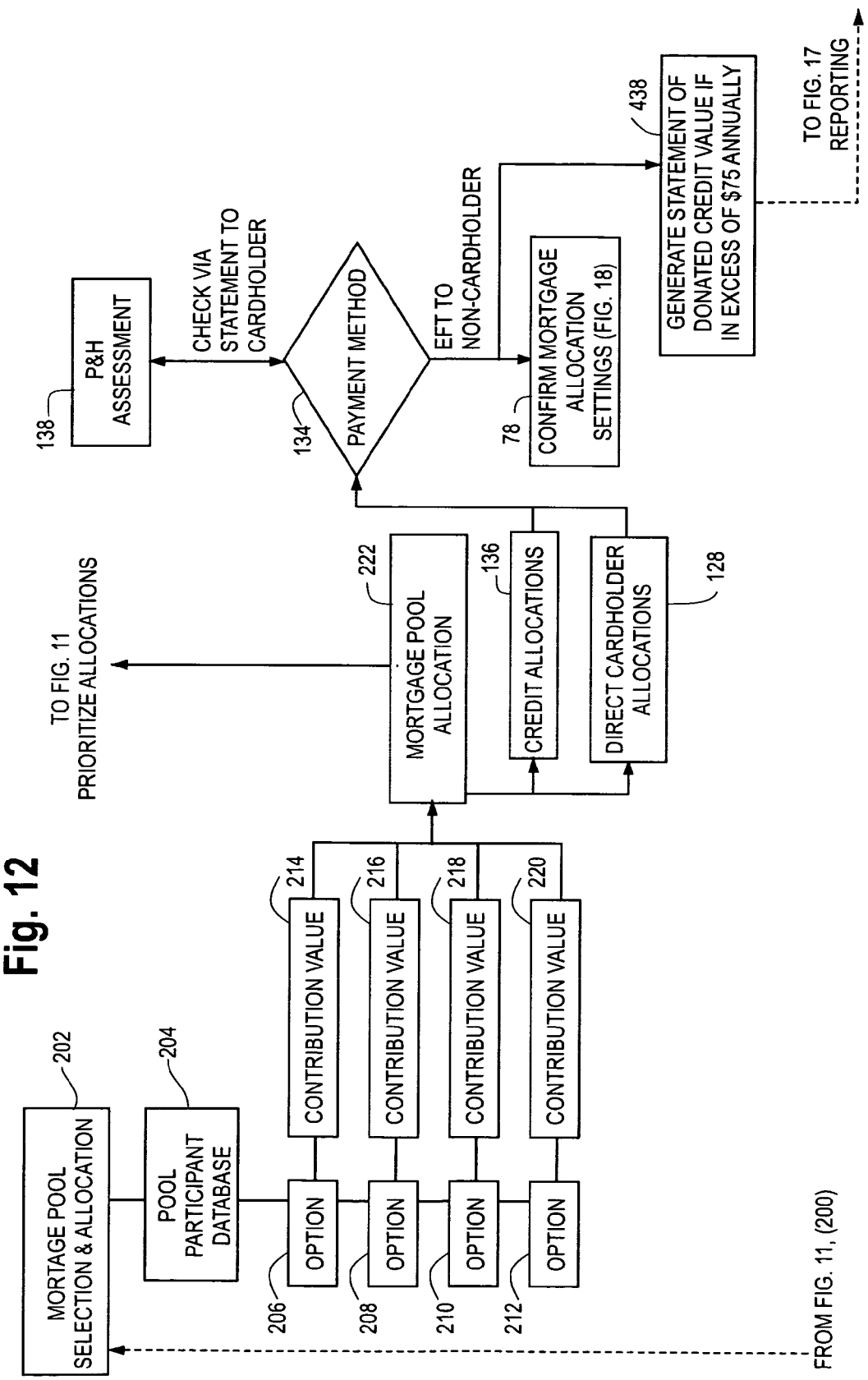
Figure 13:
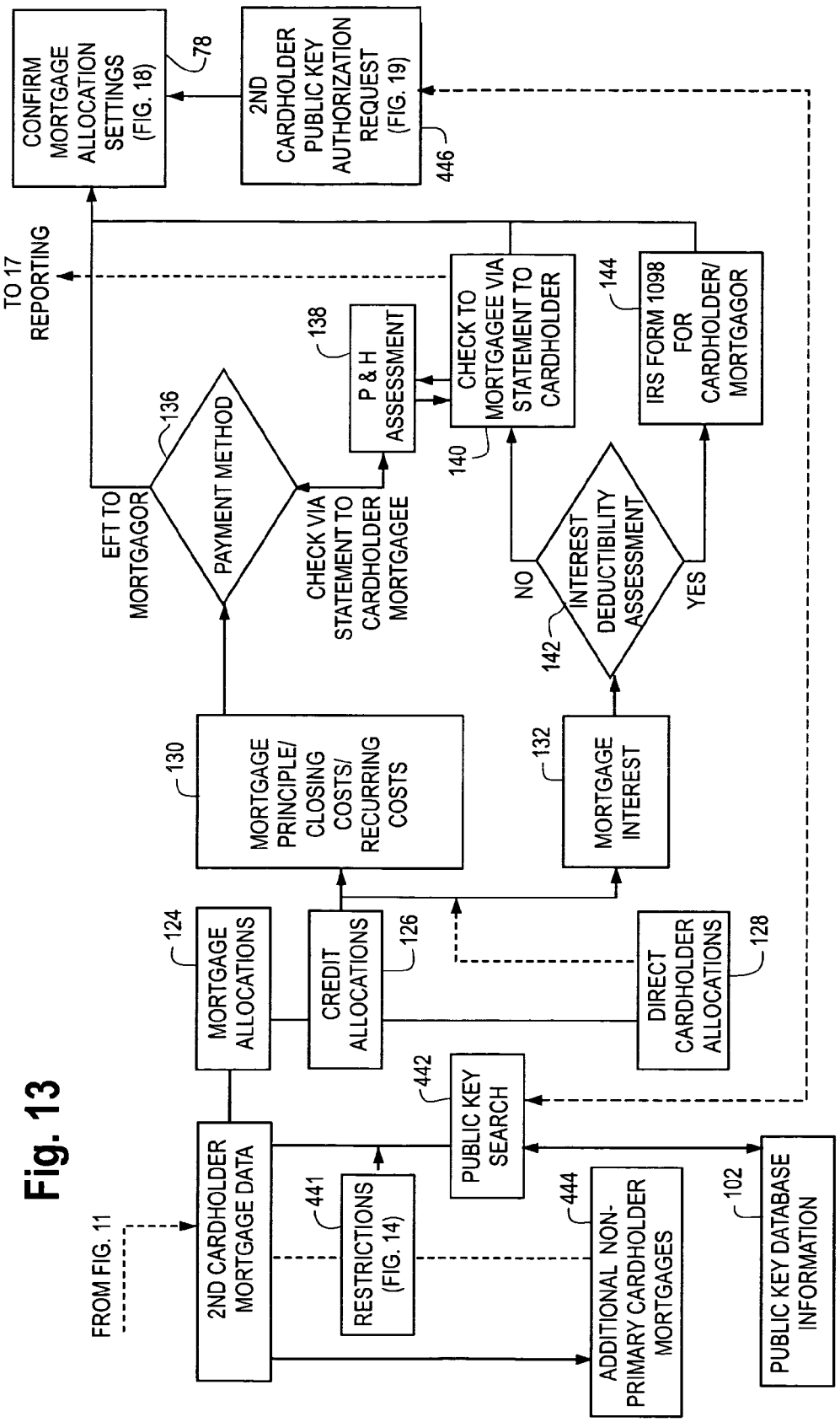
Figure 14:
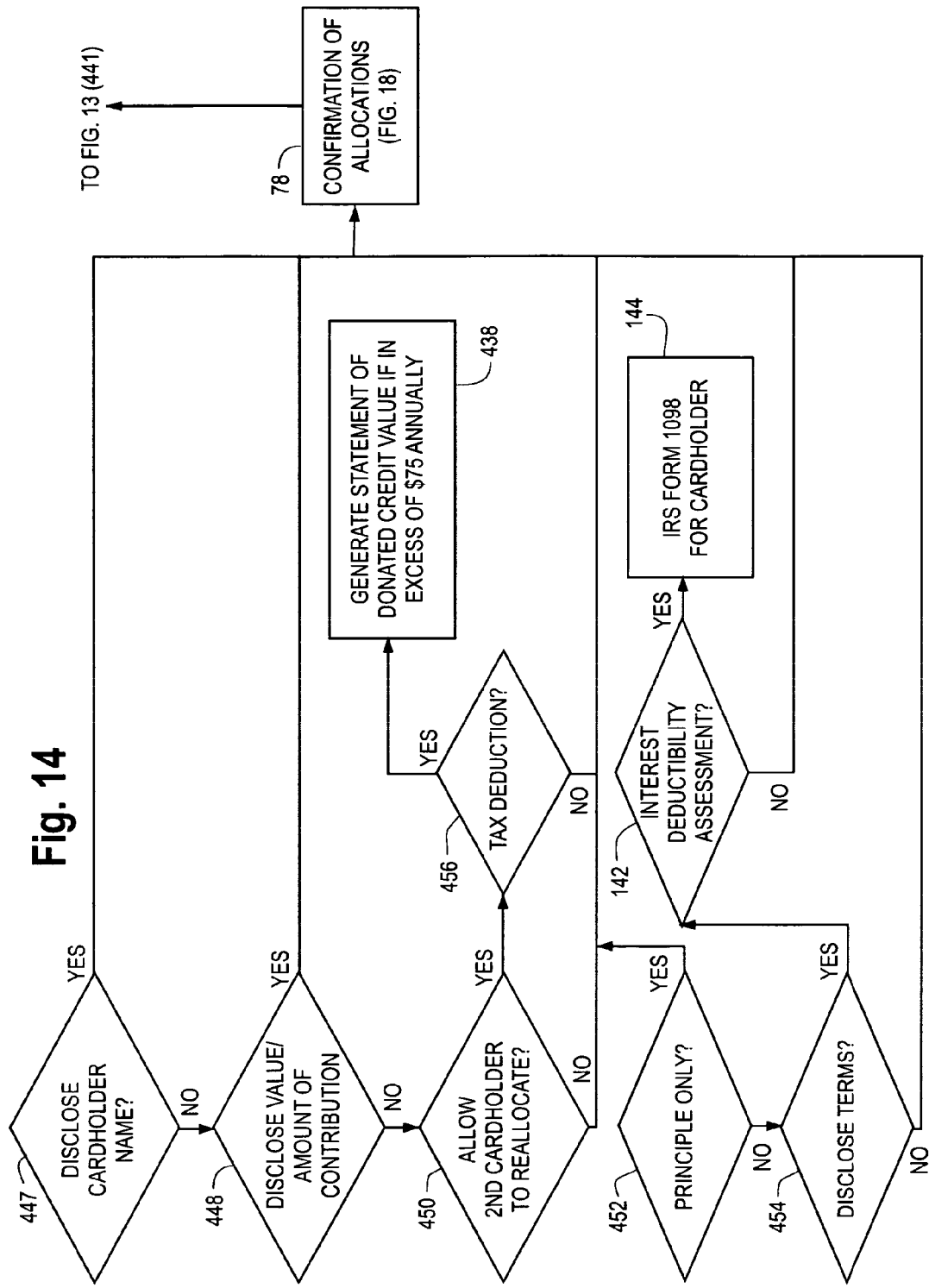
Figure 15:
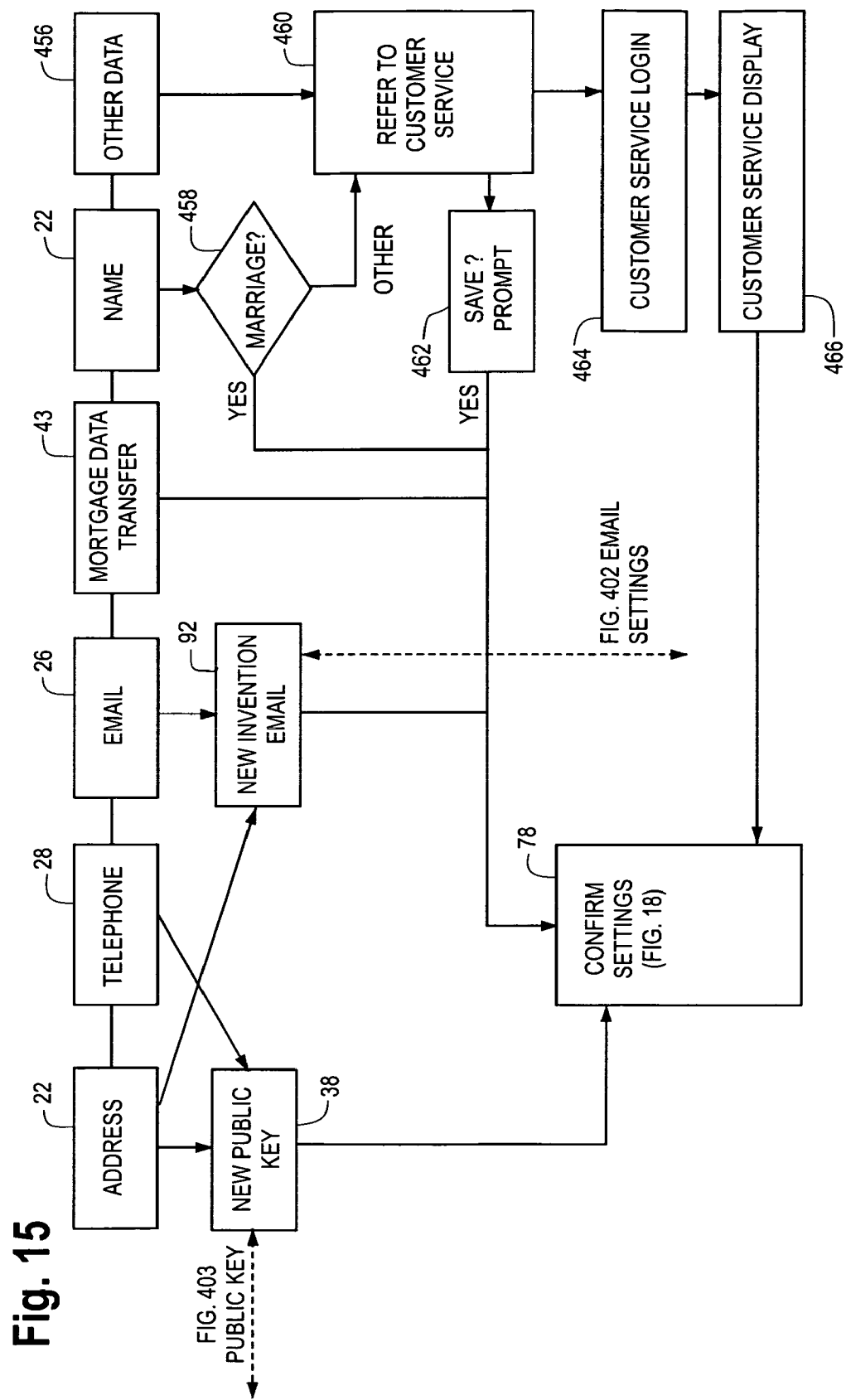
Figure 16:
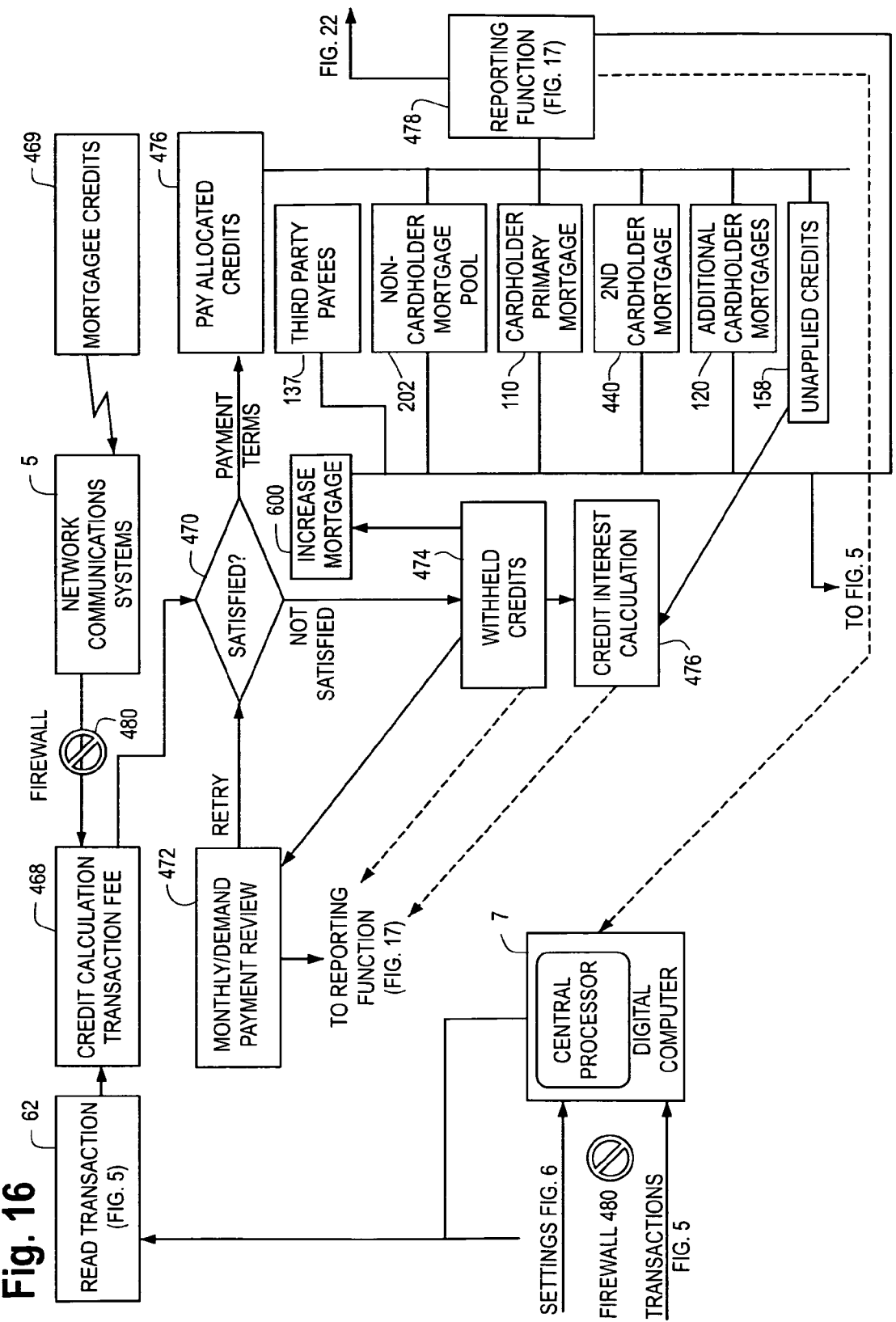
Figure 17:
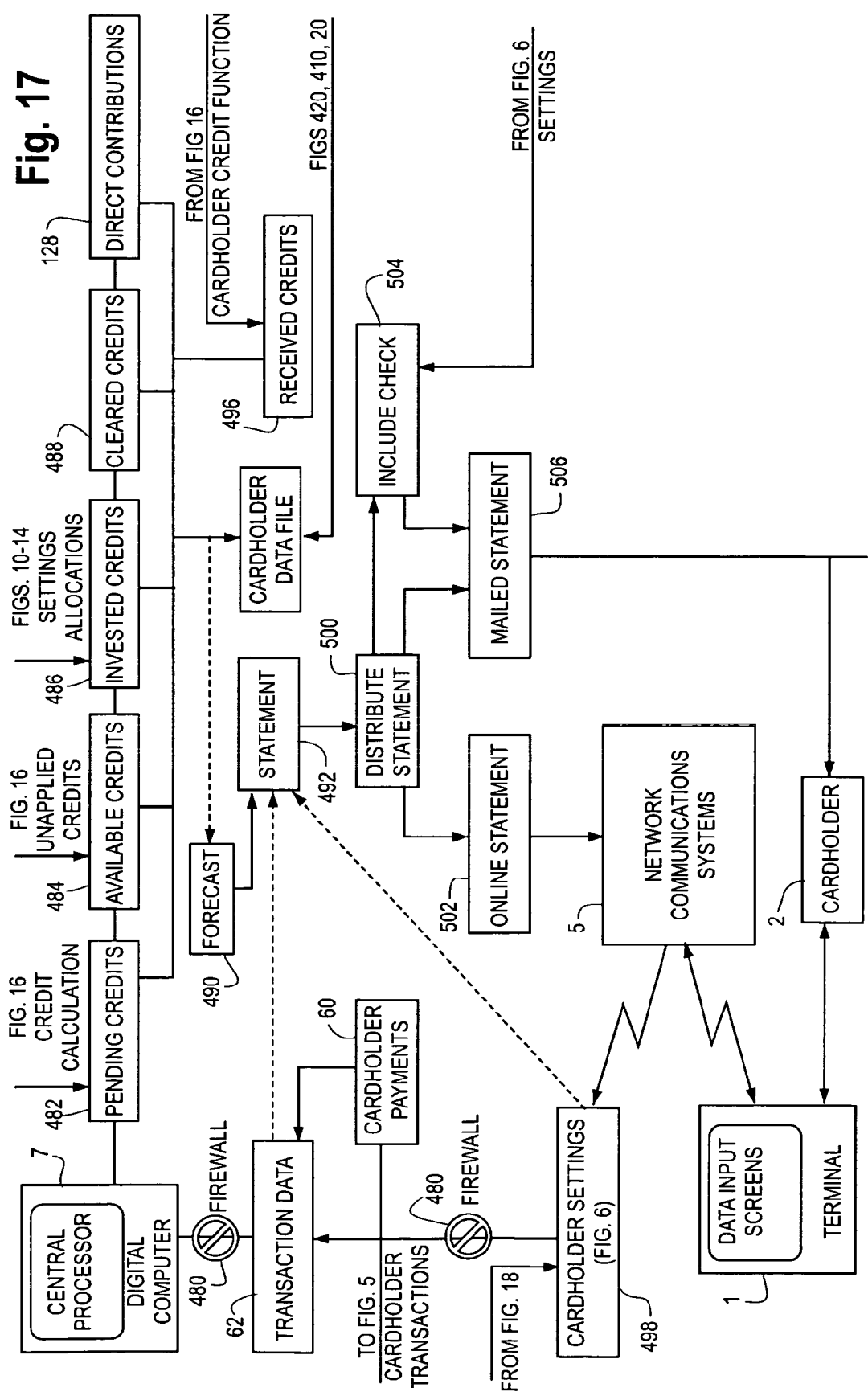
Figure 18:
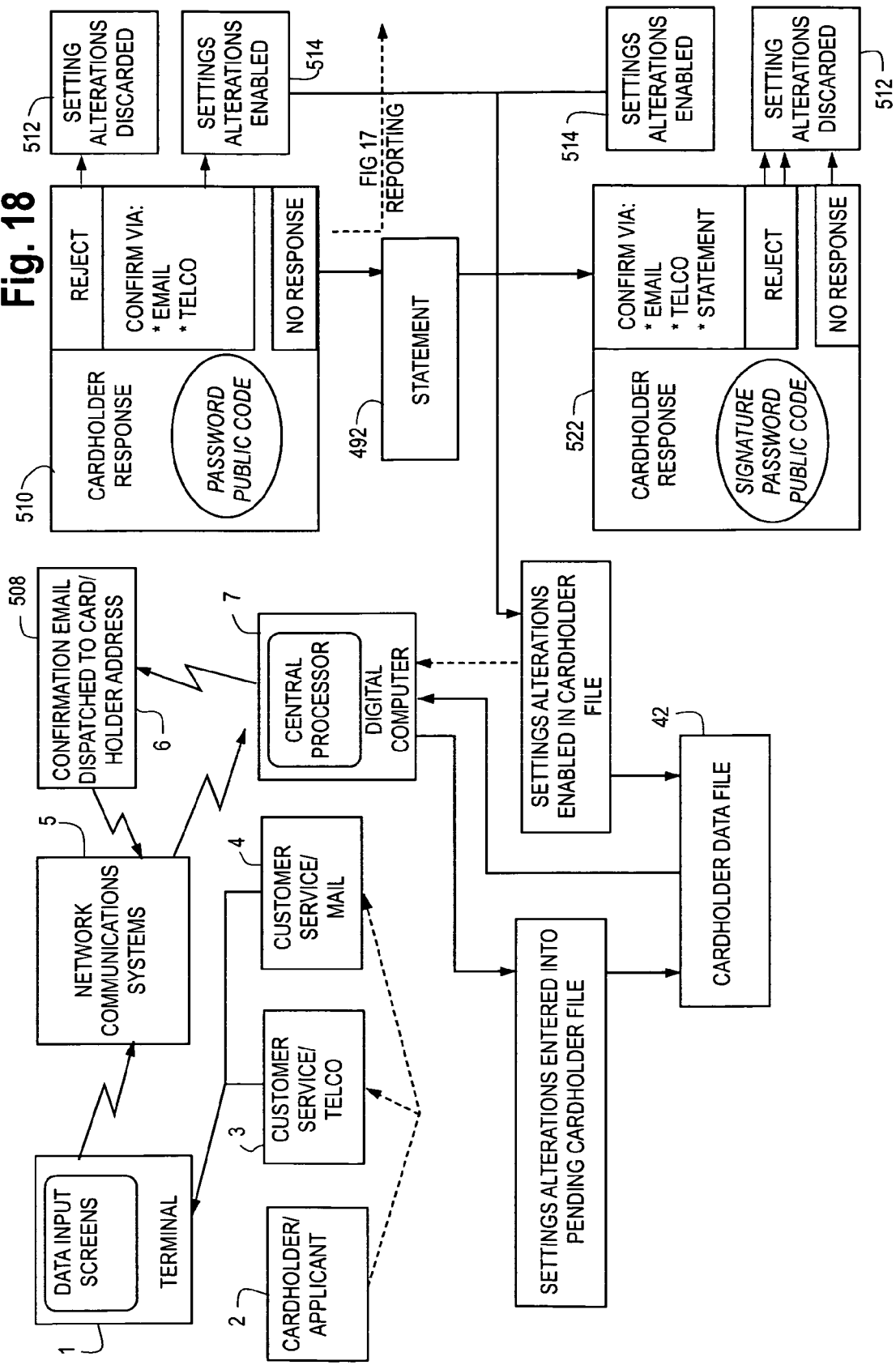
Figure 19:
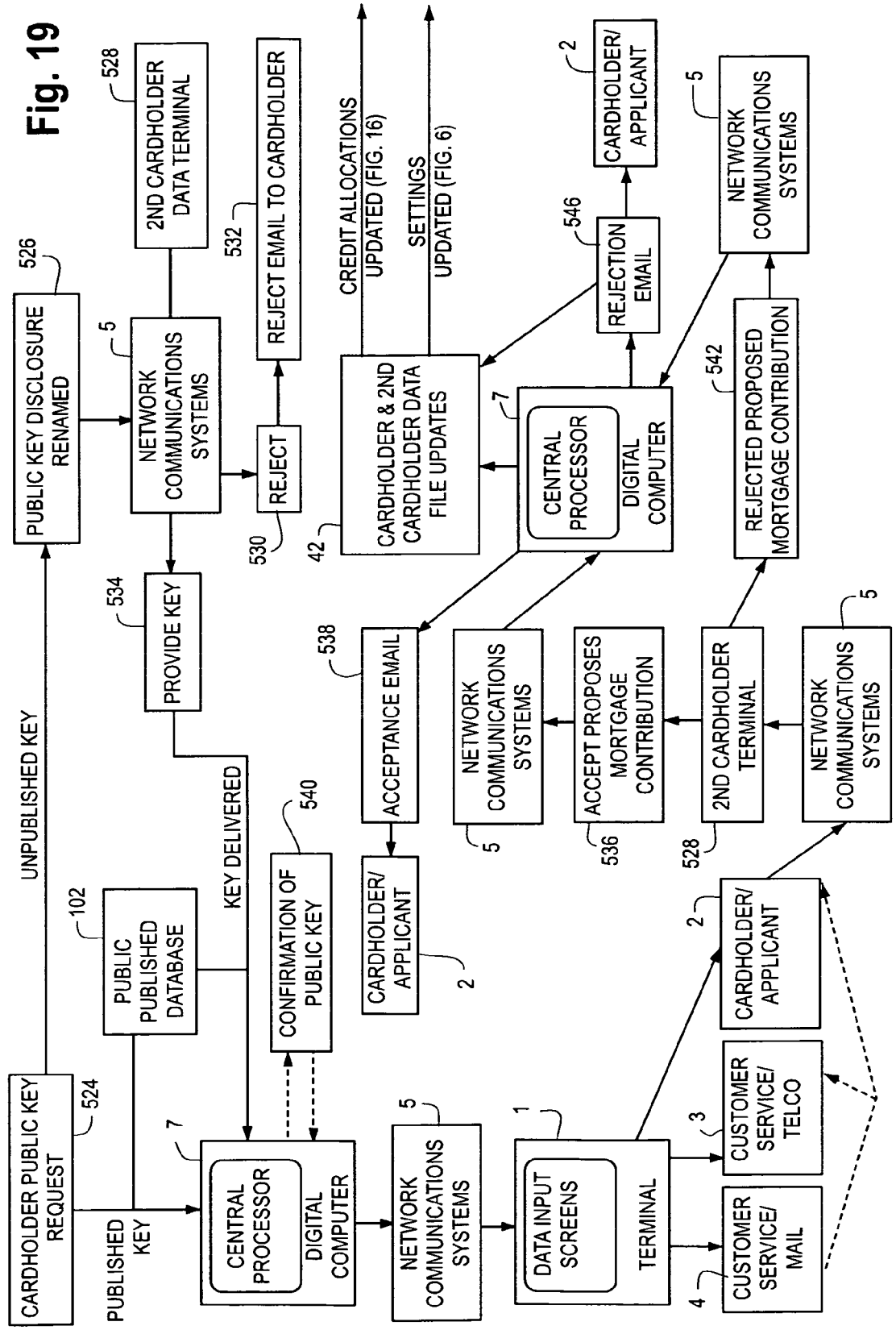
Figure 20:
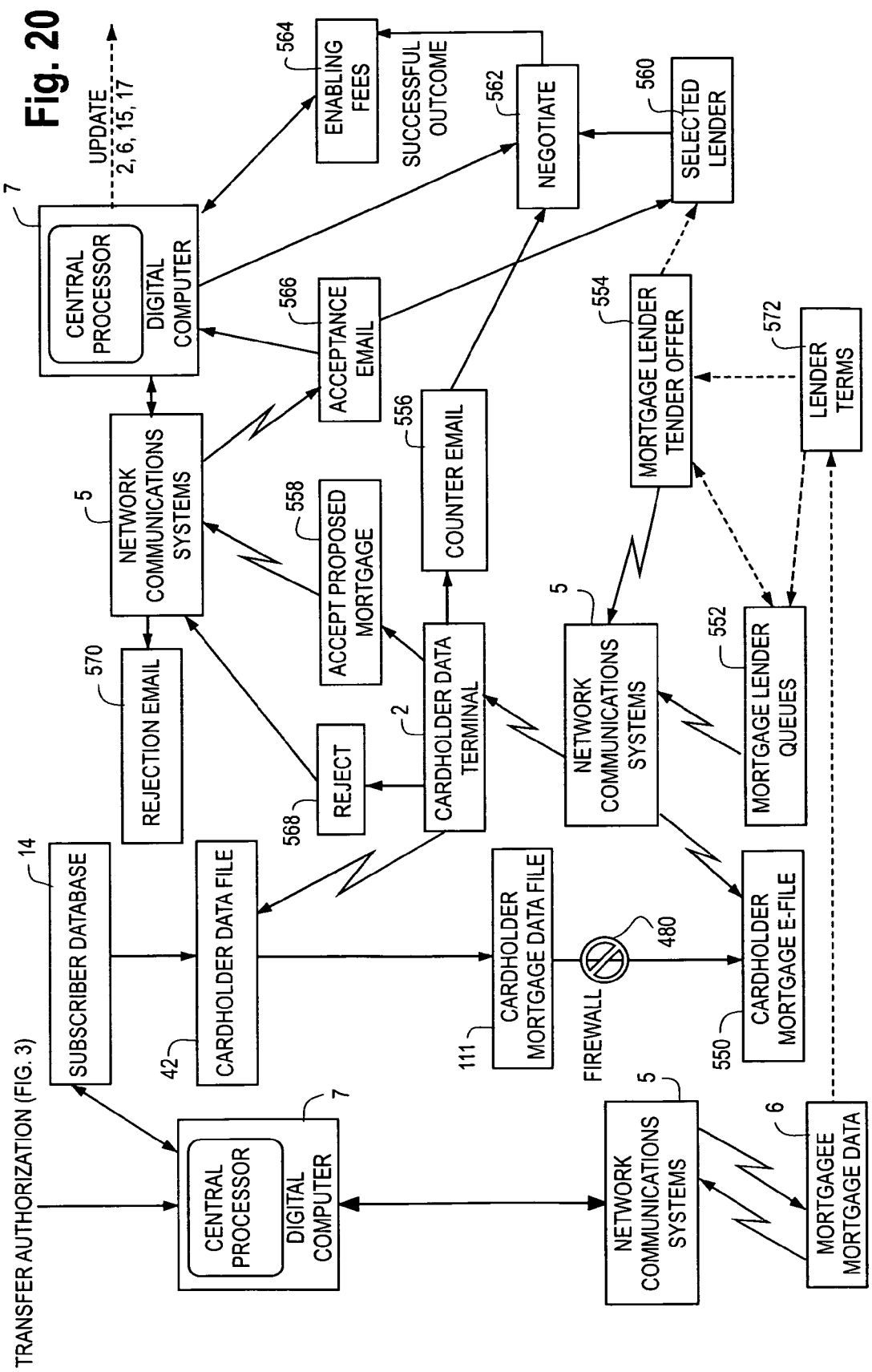
Figure 21:
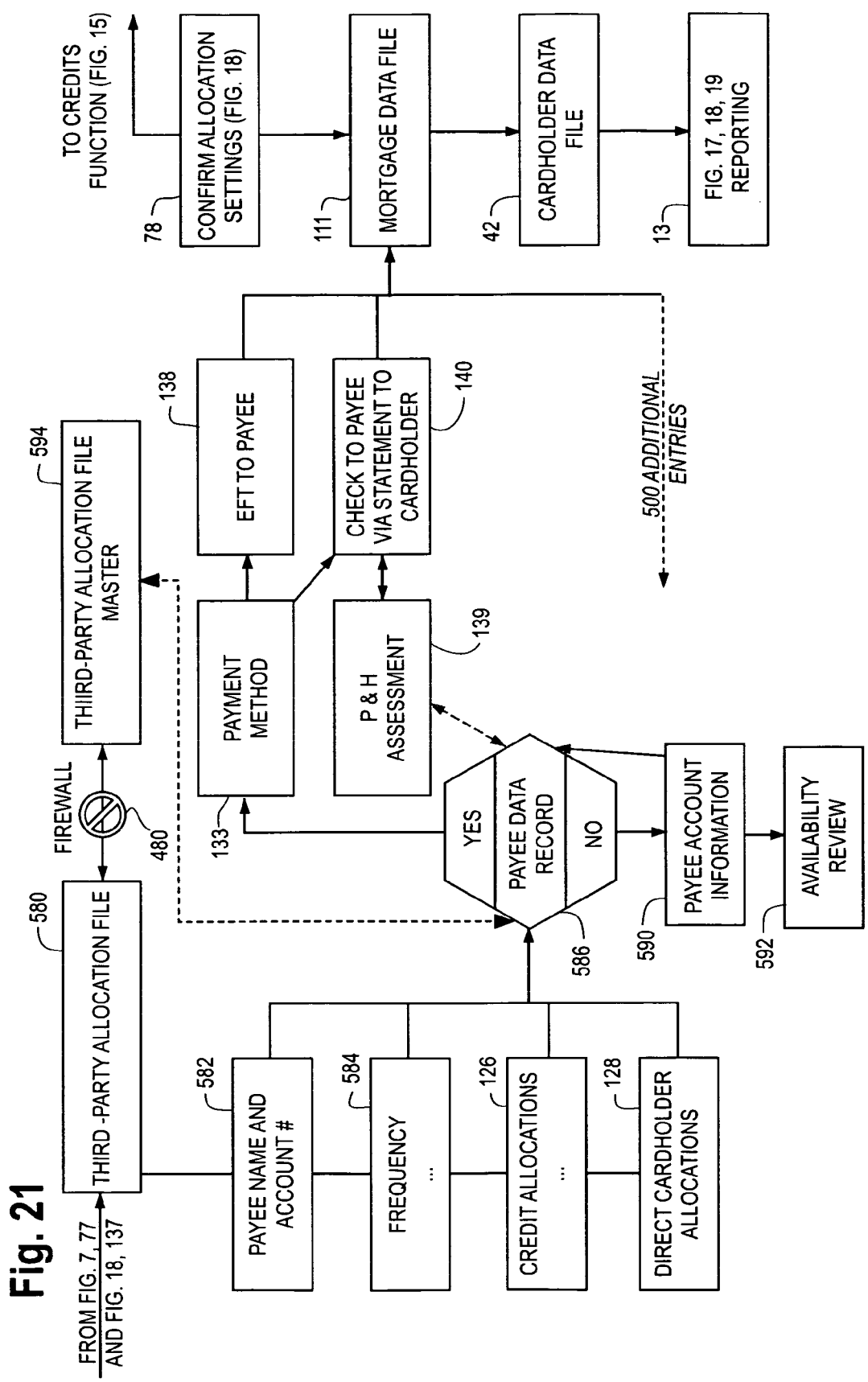

FIG. 1 is an illustration of an embodiment focusing on hardware features;
FIG. 2 is an illustration of a flow chart for an embodiment;
FIG. 3 is an illustration of a flow chart for an embodiment;
FIG. 4 is an illustration of a flow chart for an embodiment;
FIG. 5 is an illustration of a flow chart for an embodiment;
FIG. 6 is an illustration of a flow chart for an embodiment;
FIG. 7 is an illustration of a flow chart for an embodiment;
FIG. 8 is an illustration of a flow chart for an embodiment;
FIG. 9 is an illustration of a flow chart for an embodiment;
FIG. 10 is an illustration of a flow chart for an embodiment;
FIG. 11 is an illustration of a flow chart for an embodiment;
FIG. 12 is an illustration of a flow chart for an embodiment;
FIG. 13 is an illustration of a flow chart for an embodiment;
FIG. 14 is an illustration of a flow chart for an embodiment;
FIG. 15 is an illustration of a flow chart for an embodiment;
FIG. 16 is an illustration of a flow chart for an embodiment;
FIG. 17 is an illustration of a flow chart for an embodiment;
FIG. 18 is an illustration of a flow chart for an embodiment;
FIG. 19 is an illustration of a flow chart for an embodiment;
FIG. 20 is an illustration of a flow chart for an embodiment;
FIG. 21 is an illustration of a flow chart for an embodiment; and
FIG. 22. is an illustration of a flow chart for an embodiment.

As used herein,"embodiment" should not be construed as the sole manner, but rather as an illustrative teaching, much as though teaching mathematical addition does not require setting out every numerical combination to convey the concept extending beyond the teaching examples.

V. Modes

The accompanying drawings illustrate embodiments intended to illustrate and exemplify in a teaching manner.

As used herein, the term"computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow or"logic means" can be implemented in discrete circuits, programmed computer, or the equivalent. Computer-readable media, as used herein can comprise at least one of a RAM, a ROM, A disk, an ASIC, and a PROM. Industrial applicability/technical affect is clear from the description, and is also stated below, e.g., as regards controlling a computer system, or part thereof, so as to affect efficiency management of computer resources, rate and manner of data transfer (e.g., by way of standardizing data by template input or computers in the system adapted to cooperate such as by"knowing" the format, order, and/or significance to attribute to data being transmitted/received.

By way of the following prophetic teaching, there can be computer support, as in a data processing system, for implementing parts of, or from, a financial product or instrument to accomplish certain financial objectives to and advance such as efficiency and/or security, over said manual systems and corresponding problems, and automated variants having limitations regarding management of corresponding computer resources. The computer system can have control means, varying from a menu to other means facilitating human control over the computer system so as to enable and disenable carrying out some or all of the functionality characterized herein. Representatively (and not hereby limiting), the functionality can include enabling and/or disabling any one or more of:

associating card activity to increase and/or reduce mortgage or mortgage-related cost (the term"mortgage" being used broadly to encompass, for example, Sharia-compliant mortgages);

allocating card-related amounts to a mortgage, e.g., a first mortgage, over the Internet;

paying mortgages in combination or association with card activity;

increasing and/or reducing mortgage principle in association with card activity;

increasing and/or reducing other mortgage-related amounts, such as interest (not, of course, in Sharia-compliant embodiments), insurance, payment of mortgage closing costs, which include mortgage insurance, inspections, appraisals, credit reports, special assessments, impact fees, new construction fees, homeowner assessments, points, tax escrows, stamps and other government fees and taxes, and downpayments etc.;

associating a mortgage and a card in a manner that is Sharia compliant;

communicating data relating to card/mortgage computing;

utilizing data input screens or templates in forming a data standard enabling carrying out the communication in a manner suitable for integrated computing, e.g., as regards mortgages, insurance, title insurance, and other mortgage-related business;

facilitating trading of mortgages related to card activity;

facilitating consumer access to at least some card/mortgage computing;

enabling a reward system, even implemented in real time, sustaining the consumer's perspective of the value of the credit card thus increasing the likelihood of retaining the consumer's business;

enabling an amount from an unpaid card debit to be added to a mortgage such as a first mortgage;

enabling an ongoing relationship between card usage and a mortgage provider or holder;

These and/or the other computer-aided embodiments herein, as apparent from the specification as a whole, can be carried out by providing an improved digital electrical computer-based system configured to address and/or control the embodiments. The system can, as may be desired in one application or another, be thought of as including a machine (programmed computer or computers), methods for making and using the same, products produced by thereby, data structures, and necessary intermediates (e.g., data computed along the way). The system, as may be desired in one application or another, be thought to include a system such as that for card (bank, credit, debit, contactless, cell phone, or the like) activity-based mortgage crediting and/or debiting. More particularly, the foregoing can be carried out by steps including: associating card activity with a mortgage of a cardholder; crediting and/or debiting an amount to the mortgage responsive to the card activity (which may be balance on the card, e.g., after some period of time); and generating output including the charge card activity-based mortgage crediting and/or debiting; wherein at least some of the steps are carried out by a digital electrical computer system. Note that the system may be directed to crediting or to debiting or to both—this is a matter of choice in preferred embodiment for a particular circumstance or application.

In any of the embodiments, the method can be carried out further including the step of: communicating a funds transfer to the cardholder.

In any of the embodiments, the method can be carried out with the step of communicating including: printing a check for the amount; printing a coupon with the amount for carrying out payment of the mortgage or card with the check; and combining the check and the coupon with a statement of the card activity in an envelope so as to address the envelope to the cardholder.

In any of the embodiments, the method can be carried out further including the step of: communicating a funds transfer to a mortgage servicer or a funds transfer from the mortgage servicer, associating card activity with an internal mortgage, which is a mortgage or mortgage servicing either wholly or partially within the credit card issuer's corporation, company, subsidiary, affiliate, or related entity, and associating card activity with an external mortgage, which is the mortgage or mortgage servicing not being part of the credit card issuer's corporation, company, subsidiary, affiliate, or related entity.

In any of the embodiments, the method can be carried out such that the communicating includes an electronic funds transfer.

In any of the embodiments, the method can be carried out such that the communicating includes: printing a check for the amount; printing a coupon with the amount for carrying out payment of the mortgage or card with the check; and combining the check and the coupon with a statement of the card activity in an envelope so as to address the envelope to the mortgage servicer or card issuer.

In any of the embodiments, the method can be carried out further including the step of: computing a forecast for repayment of the mortgage from the card activity or increase of payment or negative amortization field; and wherein: the step of generating output includes generating output including the forecast.

In any of the embodiments, the method can be carried out further including the step of: communicating the forecast and payment or negative amortization field changes to the cardholder.

In any of the embodiments, the method can be carried out further including the step of: changing an allocation of the credit and debit activity with the mortgage in response to an instruction from the cardholder.

In any of the embodiments, the method can be carried out further including the step of: changing an allocation of the credit and debit activity between the mortgage and a second mortgage in response to an instruction from the cardholder.

In any of the embodiments, the method can be carried out further including the step of: changing an allocation of the credit and debit activity between interest, principle, and closing costs, scheduled installment payment, rent payment, fee payment for the mortgage in response to an instruction from the cardholder.

In any of the embodiments, the method can be carried out further including the step of: changing an allocation of the credit and debit activity with the mortgage in response to an instruction from the mortgage holder.

In any of the embodiments, the method can be carried out further including the step of: changing an allocation of the credit and debit activity between the mortgage and a second mortgage in response to an instruction from the mortgage holder.

In any of the embodiments, the method can be carried out further including the step of: changing an allocation of the credit and debit activity between interest, principle and closing costs of the mortgage , scheduled installment payment, rent payment, fee payment in response to an instruction from the mortgage holder.

In any of the embodiments, the method can be carried out such that the step of changing is carried out in response to the instruction from the mortgage holder received over a network.

In any of the embodiments, the method can be carried out further including: allocating a portion of the credit and debit activity between the mortgage and a charity; and issuing a tax deduction statement to the cardholder.

In any of the embodiments, the method can be carried out still further including: allocating contributions received from a charity or other assistance program to the cardholder.

In any of the embodiments, the method can be carried out further including the steps of: computing an annual statement of said crediting and debiting; and communicating the annual statement to the cardholder.

In any of the embodiments, the method can be carried out such that the step of computing an annual statement includes: computing mortgage interest paid by the crediting.

In any of the embodiments, the method can be carried out further including the steps of: associating a monthly payment with the mortgage; and communicating a funds transfer including the payment to a mortgage servicer.

In any of the embodiments, the method can be carried out further including the steps of: associating an allocation of the credit and debit activity with the mortgage and with a second mortgage of the cardholder; wherein the step of crediting and debiting the amount to the mortgage is also responsive to the allocation; and further including crediting and debiting a second amount to the second mortgage responsive to the allocation; wherein the step of generating the output includes generating the output including the crediting and debiting a second amount to the second mortgage.

In any of the embodiments, the method can be carried out further including the step of: associating the mortgage with second card activity of a second cardholder; crediting an amount to the mortgage responsive to the second card activity; and wherein the step of generating output includes generating the output including the second charge card activity-based mortgage crediting and debiting.

In any of the embodiments, the method can be carried out further including the step of: generating second output including the second charge card activity-based mortgage crediting and debiting, but not including the card activity of the cardholder of the mortgage; and communicating the second output to the second cardholder.

In any of the embodiments, the method can be carried out further including the step of: communicating a funds transfer to a charity for payment of the mortgage.

In any of the embodiments, the method can be carried out further including the step of: using a second computer to compute a valuation of a mortgage-backed security in response to indicia of said crediting and debiting.

In any of the embodiments, the method can be carried out, or perhaps viewed differently, as a method for carrying out card activity-based mortgage crediting and debiting, the method including the steps of: forming a combination in an envelope, the combination including at least two of: a check printed with an amount to pay a mortgage and card balance, said amount determined by crediting and debiting responsive to card activity of a cardholder; a coupon printed with the amount for making the payment of the mortgage and card balance with the check; and a statement of showing the card activity and the crediting and debiting.

In any of the embodiments, the method can be carried out such that the step of forming includes three of said check, said coupon and said statement; and further including the step of: printing an address on the envelope so as to address the envelope to the cardholder.

In any of the embodiments, the method can be carried out such that the step of forming is carried out with at least two of said check and said coupon; and further including the steps of: printing an address on the envelope so as to address the envelope to a mortgage servicer and card issuer; combining said statement with a second envelope; and printing an address on the second envelope so as to address the second envelope to the cardholder.

In any of the embodiments, the method can be carried out, or perhaps viewed differently, as a method for making a digital electrical computer system corresponding to carrying out one or more activities indicated herein, for example, programmed for carrying out card activity-based mortgage crediting and debiting.

In any of the embodiments, the method can be carried out including the steps of: providing a digital electrical computer and data processing system comprising a digital electrical computer electrically connected to an input device for inputting data and to an output device; and programming the digital electrical computer to associate card activity with a mortgage of a cardholder, to credit and debit an amount to the mortgage responsive to the card activity, and to generate output including the charge card activity-based mortgage crediting and debiting, to form the digital electrical computer system programmed for carrying out card activity-based mortgage crediting and debiting.

In any of the embodiments, the method can be carried out such that the programming includes programming the digital electrical computer to trigger an electronic funds transfer to another digital electrical computer.

In any of the embodiments, the method can be carried out, or perhaps viewed differently, as a digital electrical computer system programmed for carrying out card activity-based mortgage crediting and debiting, the computer system including: a digital electrical computer and data processing system comprising a digital electrical computer electrically connected to an input device for inputting data and to an output device, said digital electrical computer programmed to associate card activity with a mortgage of a cardholder, to credit and debit an amount to the mortgage responsive to the card activity, and to generate output including the charge card activity-based mortgage crediting and debiting, said output including at least two of: a check printed with an amount to pay a mortgage and card balance, said amount determined by crediting and debiting responsive to card activity of a cardholder; a coupon printed with the amount for making the payment of the mortgage and card balance with the check; and a statement of showing the card activity and the crediting and debiting.

In any of the embodiments, the method can be carried out, or perhaps viewed differently, as a method for carrying out computerized card activity-based mortgage crediting and debiting, the method including the step of: crediting and debiting card activity to a mortgage payment in response to an instruction from a mortgage holder received over the Internet.

In any of the embodiments, the method can be carried out, or perhaps viewed differently, as a method for carrying out adjusting an allocation for a mortgage payment, for example, between principal and interest, or as between mortgages or in an amount such as pay off, or more rapid or slower payment, from the mortgage holder.

Along analogous lines, an embodiment can also be viewed as a method for card activity-based residential expense crediting, the method including the steps of: associating card activity with an external residential expense; crediting an amount to the residential expense responsive to the card activity; and generating output including the card activity-based residential expense crediting; wherein at least some of the steps are carried out by computer.

In any of the embodiments, the method can be carried out, or perhaps viewed differently as including the step of: applying some of the amount in a funds transfer to pay the expense.

In any of the embodiments, the method can be carried out, or perhaps viewed differently such that the step of associating card activity with an external residential expense includes the step of entering external mortgage-identifying data; and carrying out the step of crediting according to the data.

In any of the embodiments, the method can be carried out, or perhaps viewed differently such that the step of associating card activity with an external residential expense includes the step of entering external mortgage-identifying data; and carrying out the step of crediting according to the data.

In any of the embodiments, the method can be carried out, or perhaps viewed differently such that the external residential expense is a closing cost.

In any of the embodiments, the method can be carried out, or perhaps viewed differently such that the external residential expense is a downpayment.

In any of the embodiments, the method can be carried out, or perhaps viewed differently, such that the external residential expense is insurance.

Another view is that an embodiment can encompass a method for card activity-based residential expense crediting, the method including the steps of: associating card activity with a non-mortgage residential expense; crediting an amount to the residential expense responsive to the card activity; applying some of the amount to produce a payment for the expense; and generating output including the crediting and the applying; wherein at least some of the steps are carried out by computer.

In any of the embodiments, the method can be carried out, or perhaps viewed differently, such that the step of applying includes producing a closing cost payment as the payment for the expense.

In any of the embodiments, the method can be carried out, or perhaps viewed differently, such that the step of applying includes producing a downpayment as the payment for the expense.

In any of the embodiments, the method can be carried out, or perhaps viewed differently, such that the step of applying includes producing an insurance payment as the payment for the expense.

In any of the embodiments, the method can be carried out, or perhaps viewed differently, such that the step of applying includes producing a payment for at least one discount point as the payment for the expense.

In any of the embodiments, the method can be carried out, or perhaps viewed differently, such that the step of applying includes producing a prepaid interest payment as the payment for the expense.

In any of the embodiments, the method can be carried out, or perhaps viewed differently, such that the step of applying includes producing a payment to an escrow account as the payment for the expense.

In any of the embodiments, the method can be carried out, or perhaps viewed differently, such that the step of applying includes producing a payment triggering acquisition of a member of the group the group consisting of a boat, a motor home, a mobile home, a trailer, mineral rights, water rights, riparian rights, and parking space acquisition as the payment for the expense.

In any of the embodiments, the method can be carried out, or perhaps viewed differently, such that the step of applying includes producing a tax payment as the payment for the expense.

In any of the embodiments, the method can be carried out, or perhaps viewed differently, such that the step of applying includes producing a fee payment from the group consisting of a an impact fee, new construction fee, government fee, recording fee, transfer fee, miscellaneous fee, mitigation fee, origination fee, commission, review and funding fee, wire transfer and courier fee, title and closing fee, an underwriting processing fee, and a flood certificate fee as the payment for the expense.

In any of the embodiments, the method can be carried out, or perhaps viewed differently, such that the step of applying includes producing a payment for a cost from the group consisting of a stamp, a title endorsement, a tax certificate, an environmental and termite inspection, a radon test, an inspection, an appraisal, abstract search, title search, title examination, title insurance binder, and a credit report as the payment for the expense.

In any of the embodiments, the method can be carried out, or perhaps viewed differently, such that the step of applying includes producing a payment for fee payment from the group consisting of a tax service fee, an architect fee, an engineering fee, a surveying fee, an attorney fee, a realtor fee, and a notary fee as the payment for the expense.

In any of the embodiments, the method can be carried out, or perhaps viewed differently, such that the step of applying includes producing a payment from the group consisting of a dockage fee and a marina fee as the payment for the expense.

In any of the embodiments, the method can be carried out, or perhaps viewed differently, such that the step of applying includes producing a payment of a cost from the group consisting of a lot cost, land cost, equity sharing cost, development cost, infrastructure cost, material cost, landscaping, fix-up cost for work and materials used to close the loan, house-hunting costs, and moving cost as the payment for the expense.

In any of the embodiments, the method can be carried out, or perhaps viewed differently such that the step of applying includes producing a payment of a cost from the group consisting of an ongoing residential expense, the expense from the group consisting of a special assessment, a homeowner assessment, a membership fee, an association due, common area fee, and parking maintenance as the payment for the expense.

In any of the embodiments, the method can be carried out, or perhaps viewed differently such that the step of applying includes producing a payment of a cost from the group consisting of appliance acquisition, appliance upgrade, and a material upgrade as the payment for the expense.

In any of the embodiments, the method can be carried out, or perhaps viewed differently such that the step of applying includes producing a payment of a rent as the payment for the expense.

In any of the embodiments, the method can be carried out, or perhaps viewed differently as including the step of: applying a preferential crediting rate in the crediting for an internal expense.

In any of the embodiments, the method can be carried out, or perhaps viewed differently such that the step of applying is carried out in response to an instruction received over the Internet.

In any of the embodiments, the method can be carried out, or perhaps viewed differently such that the step of applying includes communicating includes printing a check for the amount; printing a coupon with the amount for carrying out payment of the mortgage with the check; and combining the check and the coupon with a statement of the card activity in a computer-addressed envelope so as to address the envelope.

In any of the embodiments, the method can be carried out, or perhaps viewed differently, including the step of: changing an allocation of the credit activity between expenses in response to an instruction from the cardholder.

In any of the embodiments, the method can be carried out, or perhaps viewed differently, as including the step of: changing an allocation of the credit activity between interest and principle in response to an instruction from a holder from the group consisting of the cardholder and an expense holder.

In any of the embodiments, the method can be carried out, or perhaps viewed differently as including the step of: allocating a portion of the credit activity to a charity; and issuing a tax deduction statement responsive to the portion.

In any of the embodiments, the method can be carried out, or perhaps viewed differently as including the steps of: computing an annual statement of said crediting; and communicating the annual statement to the cardholder.

In any of the embodiments, the method can be carried out, or perhaps viewed differently as including the step of computing an annual statement, and including: computing mortgage interest paid by the crediting.

In any of the embodiments, the method can be carried out, or perhaps viewed differently as including the steps of: allocating a portion of the amount between multiple mortgages.

In any of the embodiments, the method can be carried out, or perhaps viewed differently as including the steps of: associating the expense with second card activity of a second cardholder; crediting an amount to the expense responsive to the second card activity; and wherein the step of generating output includes generating the output including the second charge card activity-based crediting.

In any of the embodiments, the method can be carried out, or perhaps viewed differently as including the step of: communicating a funds transfer to a charity for payment of the expense.

Still another view is that an embodiment can encompass a method for carrying out card activity-based residential expense crediting, the method including the steps of: forming a combination in an envelope, the combination including at least two of: a check printed for the payment of the expense; a coupon printed for making the payment with the check; and a statement of showing the card activity and the crediting.

Still another view is that an embodiment can encompass a digital electrical computer system programmed for carrying out card activity-based residential expense crediting, the method including the steps of: providing a digital electrical computer and data processing system comprising a digital electrical computer electrically connected to an input device for inputting data and to an output device; and programming the digital electrical computer to associate card activity with an external residential expense, to credit an amount to the expense responsive to the card activity, and to generate output including the card activity-based crediting, to form the digital electrical computer system programmed for carrying out card activity-based mortgage crediting.

Still another view is that an embodiment can encompass a method for making a digital electrical computer system programmed for carrying out card activity-based residential expense crediting, the method including the steps of: providing a digital electrical computer and data processing system comprising a digital electrical computer electrically connected to an input device for inputting data and to an output device; and programming the digital electrical computer to associate card activity with an external residential expense, to credit an amount to the expense responsive to the card activity, and to generate output including the card activity-based crediting, to form the digital electrical computer system programmed for carrying out card activity-based mortgage crediting.

Still another view is that the an embodiment can encompass a method for making a digital electrical computer system programmed for carrying out card activity-based residential expense crediting, the method including the steps of: providing a digital electrical computer and data processing system comprising a digital electrical computer electrically connected to an input device for inputting data and to an output device; and programming the digital electrical computer to associate card activity with a non-mortgage residential expense, to credit an amount to the residential expense responsive to the card activity, to apply some of the amount to produce a payment for the expense, and to generate output including the crediting and applying, to form the digital electrical computer system programmed for carrying out card activity-based mortgage crediting.

Still another view is that an embodiment can encompass a digital electrical computer system programmed for carrying out card activity-based residential expense crediting, the computer system including: a digital electrical computer and data processing system comprising a digital electrical computer electrically connected to an input device for inputting data and to an output device, said digital electrical computer programmed to associate card activity with a non-mortgage residential expense, to credit an amount to the residential expense responsive to the card activity, to apply some of the amount to produce a payment for the expense, and to generate output including at least two of: a check printed for the payment of the expense; a coupon printed for making the payment with the check; and a statement of showing the card activity and the crediting.

Still another view is that an embodiment can encompass a digital electrical computer system programmed for carrying out card activity-based residential expense crediting, the computer system including: a digital electrical computer and data processing system comprising a digital electrical computer electrically connected to an input device for inputting data and to an output device, said digital electrical computer programmed to associate card activity with an external mortgage residential expense, to credit an amount to the residential expense responsive to the card activity, to apply some of the amount to produce a payment for the expense, and to generate output including at least two of: a check printed for the payment of the expense; a coupon printed for making the payment with the check; and a statement of showing the card activity and the crediting.

Still another view is that an embodiment can encompass a method for carrying out computerized card activity-based residential expense crediting, the method including the step of: crediting card activity to a non-mortgage expense payment and/or an external expense payment in response to a cardholder instruction received over the Internet.

FIG. 1 shows, in block diagram form, the computer-based elements, which can be utilized to implement a teaching embodiment. FIG. 1 is an overview. There can be, depending on the preferred manner of carrying out one embodiment or another, eleven components to the present embodiment:

1 Data Input Screens & Terminal (1)

Terminal 1 represents computers and computer screens used to enter data into the system, and to view data posted to the system. Virtually any current or recent model personal computer platform may be employed. A typical Cardholder (2) Data Input Screen could be an iMac personal computer connected to an Internet network interface using built-in 56K or Ethernet Internet Protocols. A typical Customer Service/Telco (3) Data Input Screen could be a Gateway 2000 PC running Windows 2000, a 16" Radius monitor, and a Local or Wide Area Network Ethernet connection to an internet network interface. Similarly, Customer Service/Mail (4) could be a Gateway 2000 PC running Windows 2000, a 20" Radius intelliColor e monitor, and a Local or Wide Area Network Ethernet connection to an Internet network interface. Frequently, the description will refer to the"user", meaning the system or part thereof is being accessed using a network-enabled computer by the cardholder, a Telco representative, or a Mail representative.

2 Network Communications Systems (5)

With regard to Network Communications Systems (5), any upstream, internet Service Provider (ISP) utilizing TCP/IP to transmit data between Data Input Screens. Examples of ISPs include uunet, starnetusa, and Exodus. Well-known and accepted protocols may be any transmission standard able to conduct digital information, including optical, FireWire, fiber optic, infrared, cellular, wireless, hard wire, SCSI, ethernet, trunk lines, satellite, and other like systems, may be employed.

3 Central Processor & Digital Computer (7)

Central Processor & Digital Computer (7) represents the electrical computing devices that receive, process, store, analyze and distribute data. Numerous computing devices may be employed as business volume grows. The Central Processor and Digital Computer can be comprised of these components:

one or more CPUs (Central Processing Units);
one or more digital computers commonly referred to as"servers" ("servers" are the gateway between Local Area and Wide Area digital computers);
Data storage (hard drives)
Routers;
Applications, such as web browsers, word processors, database engines, etc.

4 Mortgagor and Mortgage Data (6)

Mortgagor & Mortgage Data (6) represents third-party data sent via Electronic File Transfer (EFT) and a TCP/IP network communications system (5). Mortgages serviced by an embodiment may, on occasion, be bought and sold by mortgage provisioners. Interaction with mortgage provisioners is necessarily to enable the embodiment, i.e., to facilitate the payment of credits (see FIG. 16), and also to compute a valuation of a mortgage-based security in response to indicia of said crediting. Mortgages serviced by an embodiment may, on occasion, be solicited by other mortgage provisioners offering more attractive rates and/or terms 5Help (8)

Help (8) represents the CEhow-to, and troubleshooting guide available at all times to cardholders, cardholder applicants, and customer service representatives. It is accessed via a web browser, such as version 4 or better of either Microsoft Internet Explorer or Netscape Navigator. Help is context-enabled, indexed, and searchable by keyword and phrase.

6 Cardholder Account Registration (9)

Cardholder Account Registration (9, see FIGS. 2, 3, 4) illustrates how cardholder applicants can begin the mortgage-crediting process. In this exemplary description, cardholders, cardholder representatives, and user all refer to persons directly employing a network-enabled computer to access the embodiment.

7 Cardholder Transaction Function (11)

7 Cardholder Transaction Function (11, FIG. 5) shows how credit or other card transaction activity is typically managed through a third party and transmitted to the system, where appropriate credits and debits are determined and issued.

8 Cardholder Credits and Debits Function (12)

8 Cardholder Credits and Debits Function (12, FIG. 16) illustrates notable functions. Transaction data received from FIG. 200 functions are processed and applied, subject to criteria established by the cardholder, the card provider, other cardholders, and mortgagors.

9 Cardholder Settings (10)

9 Cardholder Credits and Debits Function (12, FIG. 16) shows how the cardholder manages his/her credit and debit transfers through Cardholder Settings. The Cardholder may alter his/her credit Settings at any time, either directly via a Data Input Screen (2), or by using either Customer Service/Telco (3) or Customer Service/Mail (4) representative as an intermediary. Debit transfers may also be altered here but may involve approval of mortgagee or third party.

10 Reporting Function (13)

10 Reporting Function (13, FIG. 17,18,19) illustrates a way for carrying out due diligence functions: (1) cardholder statement generating; (2) tax compliance and document generating; (3) third party information exchange & verification.

11 Subscriber Database (14)

11 Subscriber Database (14) illustrates a representative central storage system for all individual cardholder data.

Turning now to the Cardholder Account Registration Function (FIG.2), there is illustrated a cardholder application, approval, and activation process.

Application

Use of an embodiment can involve a user to applying for a credit or other such card. Typically, applications are managed via third-party credit card from provisioners such as MBNA, VISA, FirstUnion, and many others. A cardholder or cardholder applicant may utilize an embodiment in one of three exemplary methods:

via Data Input Screen at Terminal (1)
Using a network-enabled computer, such as a PowerPC604e and Apple Cinema display, the cardholder links to the network site by telephone, or telephone-adaptive device, such as TDD (16). Using his or her touch-tone phone or TDD, the customer interacts with Customer Service Center/Telco representatives (3).
a printed application (18), which the applicant submits via mail
Customer Service/Mail representatives process mailed applications (4) and entered as input into the terminal 1.

Regardless of its source, all incoming applications are routed through Network Communications Systems (5) to the Central Processor Digital Computer (7), where the application information (FIG. 3) is requested, entered, and submitted.

Turn now to the Cardholder Account Registration: Credit Card Provisioner Registration Process (FIG.3). The list of requested information stated in FIG.3 (at Block 20), constitutes information requested from a credit card applicant by the provisioner. For the purposes of this embodiment, the following line items should be requested:

First Name, Middle Name, Last Name, Street Address, City, State (22);
Zip Code (24);
E-mail address (26); and
Home Phone (28).

Once the application has been submitted (in one way or another) electronically, it is reviewed and either approved or rejected (30). As noted earlier, this is a third-party process, including issuance of a credit card number.

If rejected, standard protocols call for the generation of a refusal letter, which is mailed to the applicant (32). If accepted, then applicant information is transmitted from the card provisioner to the system via (34).

Here, the embodiment can execute some interesting possible functions.

1. Cardholder datafile (42)

The embodiment generates a timestamp ID for the Cardholder Datafile (42).

The timestamp ID is a temporary name for the data file, and also will be used by the applicant as a temporary password. Application data supplied by the credit card provisioner (20) is transmitted into the file (42).

Typically, this data is transmitted as a text file using a common data field delineation procedure and Electronic Data Interface (EDI) Internet Protocols. In addition to application information, it includes credit card number, credit limit, and expiration date.

2. Unique email and data file name (36)

Computer code is employed to parse information requested in Elements 22 and 26, generating a unique email address for the new cardholder. For example, a new cardholder provides the following data (20):

Name: Phillip
Middle: [null]
Last: Carragher
Street Address: 970 East Lane
City: Windsor
State: CO The embodiment generates the unique email:

Phillip_Carragher_970EastLane_Windsor_CO@mail.mortgagebuyers.com

The Central Processor (7) searches the subscriber database (14) for duplicate addresses. In the highly unlikely event that a duplicate is found, the CPU will modify the email address by altering the mail server name, e.g., Phillip_Carragher_970EastLane_Windsor_CO@mail2.mortgagebuyers.com. If that address is also a duplicate, the embodiment will continue to search for the first available unique address, e.g.:

Phillip_Carragher_970EastLane_Windsor_CO@mail3.mortgagebuyers.com, etc.

At no time will the cardholder/applicant see an error message appear on screen advising that another user has already taken a submitted ID. Once a non-duplicate address is ascertained, the Central Processor (7) replaces the time stamp ID in the cardholder data file (42) with the newly generated email address.

3. Existing email verification and redirect. (36)

The Central Processor (7) reads the email field of the cardholder,s application (26). If the field value is not [null], a mail filter inserts the field value into the cc: field parameters for all outbound cardholder email (see FIG. 8). If the field value is [null], the cardholder data file (42) is flagged as CEnon-email accessible., No value is entered in the cc: field parameter.

4. Public Key generation (38)

An notable possible component of the embodiment is security, e.g., the generation of a Public Key, which may be used by cardholders to contact and transact with other cardholders. The Public Key is therefore not a CEsecret, password. However, in order to preserve the privacy of cardholders, the Public Key is not a readily discernable key combination, such as a name, address, credit card number or social security number.

Each Public Key can be parsed from the Home Phone (28) and Zip Code (24) data contained the user application (20). For example:

Home Phone: 970-686-0332
Zip Code: 33245

Generates a Public Key Code of 686033233245. The generated Public Code is stored in the user data file (42). The Public Code is managed using the Public Code Status (FIG. 19) interface. [NOTE: special settings for the Public Code may be enabled (FIG. 19) following completion of the cardholder application, approval and activation process.]

5. Balance transfer and other awards (40)

The embodiment operator, credit provisioners and/or third parties may from time to time elect to award new approved applicants with credits, special rates, or other awards.

These are promotional items serving as inducements to apply. It is anticipated such offers will be advertised. It is further assumed that the awards, their relative value, and their availability, will change from time to time. Awarded credits are reported to the cardholder at FIG. 17, Available Credits (484).

6. Mortgagor Data Transfer Authorization (43)

This function relates to implementation of loan auctioning., The Cardholder (2) authorizes or prohibits the embodiment from retrieving the cardholder's (2) complete electronic mortgage file from his/her mortgage provisioner (6). If the cardholder prohibits the transfer, no further action is taken. If enabled ("YES"), the embodiment requests the data transfer (6,FIG. 1). The cardholder (2) may link to FIG. 20, Auction Management, to establish opt-in criteria. At this time, the embodiment has processed and stored an approved cardholder's application information. An email address and account has been generated. A public key has been created.

Awards, if any, have been credited. Mortgage Data Transfer has been authorized or disallowed.

7. Authorization

The cardholder now may activate the account (FIG. 4). All cardholders receive an Applicant Acceptance Notification (44) that contains their new credit card number(s), credit information, billing information, authorization information and Public Key (38). The Notification (44) is delivered in three forms: (i) a Postal Mail package (46), which contains the above information, as well as the physical credit card(s), is sent to all cardholders; (ii) email (48), is transmitted to all new user email accounts, wherein the email contains the same information as the letter; and/or (iii) in lieu of the card, cardholders receive the information necessary to activate and use the card immediately online and for other cardless credit purchases (e.g., catalog ordering), and of course the card(s) can be sent via Postal Mail package (46).

Cardholders who applied via telephone using a Customer Service/Telco representative (3), similarly receive the mail letter and email described above. The Telco representative relay information (including card number[s]) to the user. All users can eventually receive their physical credit card(s) via the Postal Mail package (46).

The embodiment now authorizes card use (50). Authorization may take place immediately upon completion of the just-described Approval process, or at any time subsequently. In either case ^ immediate or delayed authorization ^ authorization is performed via computer, either by the cardholder online (2), or via Customer Service/Telco (3).

In the former case (2), the cardholder uses his or her computer (1) to access the network (5) and central processor (7) directly. In the latter case (2), relevant information is passed via telco device to a Service Center/telco representative, who then passes the data via the network (5) to the central processor (7). [NOTE: The various available protocols for authorizing new card use via telco are well known and thus not described here in detail.) Login (52) utilizes a combination of the cardholder credit card number, followed by the cardholder Public Key (38). Data entered by the cardholder is compared against the number and Public Key stored in the cardholder data file (42).

If the Public Key (38) or card number is incorrect, the cardholder may attempt to reenter (54) the information (52). In the event of three login failures, the terminal operator (cardholder or Customer Service/Telco defaults to the context-sensitive Help screen (5).

If Public Key and credit card numbers are correct, the login is successful and recorded in the customer data file (42).

Cardholder transaction capability is immediately activated (FIG. 5) and the embodiment links the user (cardholder (2) or Customer Service/Telco [3]) to Cardholder Settings (FIG. 6).

The Cardholder Application Process (FIG. 2,3,4) is complete, and for Transactions (FIG. 5), the Transactions Function utilizes standard protocols to initiate, authorize, and track credit card transactions. Transactions (56) are authorized by upstream transaction processors (58), which transmit (5) to the Central Processor (7), which logs activity into the Cardholder Transaction Database (62), linked to the Cardholder Data File (42). Transaction data is routed to Cardholder Credit Allocation (FIG. 16), and Reporting (FIG. 17).

Turning to Cardholder Settings (FIG. 6), numerous functions can be carried out, all of which are accessible preferably solely by Data Input Screen Terminal (1):

Main settings interface (FIG. 6);
Password creation and modification (64) (FIG. 7);
Email status (66) (FIG. 8);
Public key (68) (FIG. 9);
Mortgage Allocation (70) (FIG. 10);
Allocation Options (FIG. 11);
Mortgage Pool Non-cardholder Contribution Allocation (72) (FIG. 12);
2nd Cardholder Allocation (74) (FIG. 13);
2nd Cardholder Allocation Restrictions (FIG. 14);
Third Party Allocations (FIG. 21); and
Application Modification (76) (FIG. 15).

Settings are stored in the Cardholder Data File (42). Settings may be altered solely by use of a Data Input Screen Terminal (1). Changes may be input directly by the cardholder (2), employing a computer such as an iBook laptop utilizing a 56K internal modem and an Internet Explorer Version 5 browser, by a Customer Service/Telco representative (3) acting on behalf of a cardholder, or by a Customer Service/Mail representative (4) charged with inputting Settings data supplied to the embodiment via the cardholder statement (FIG. 17). All changes to settings are confirmed through (78) FIG. 18.

More particularly, in Password Creation and Modification (FIG. 7), the password is a secret code the cardholder must use to access his or her account. The password is distinct from the Public Key (FIG. 9). On first use, no password exists and the value of Password Status (80) is [NULL].

The Cardholder or Customer Service/Telco representative enters a password or pass phrase at Block 82. There is no maximum or minimum length, although cardholders will be advised to select a password of at least six alphanumerics. On [SUBMIT], the embodiment performs a Uniqueness Test (84), scanning the complete Subscriber Database (14) for duplicates. NOTE: As envisioned in this embodiment, there is no need to conduct this Uniqueness Test, as each customer's primary ID is unique. Password duplications are therefore irrelevant. However, the inventors recognize that future or other security needs may require unique passwords. The password is entered into the Cardholder Database (42), and is activated pending Confirmation (78) (FIG. 18).

Modifying a password (86) utilizes standard online procedures.

Old password: oooooooooooo
New password: oooooooooooo
Confirm new password: oooooooooooo
Activate.

The changed password is stored in the Cardmember Data File (42). The embodiment refers to FIG. 18, Confirmation of Allocations. Email (88) is a sub-routine executed whenever a cardholder revises his or her application information (FIG. 15). Changes to First Name, Middle Name, Last Name, Street Address, City, State (22) instruct the embodiment to generate a new embodiment email (92). The embodiment executes its uniqueness test (84) by a search of the subscriber database (14). The cardholder is queried whether to replace his/her existing embodiment email address with the new embodiment email address. (94). If YES, the embodiment enables the new address (pending confirmation). If NO, the embodiment writes the new address in the cardholder data file (42), but continues to display the old address.

In the event of a change in a cardholder's email (26) the embodiment replaces the prior email field value with a new value at establish/change redirect email (90). The embodiment's new email is activated upon confirmation (FIG. 18).

Public Key (FIG. 9) involves a routine for allowing the cardholder to determine what information is displayed in the searchable Public Key Database (102). This database comprises the shared interface between cardholders and is thus critical to the implementation of the method of claim 18, associating the mortgage with second card activity of a second cardholder. The cardholder may elect either to Display Public Key (98), or Not Display Public Key (96) in the Public Key Database (102). If the cardholder elects to display, s/he may manage the amount of additional information to be displayed in the Public Key Database (102). This process is managed through the Public Key Options (108) interface. Here are the default values for the available options."1"==enabled;"0"==Not enabled; [NULL]==void; no content; REF==Referral Link Public Key 1
Cardholder name 0
Target mortgage#
Target mortgage address 0
Cardholder embodiment email 1
Text information [NULL]
Image [NULL]
URL [NULL]
Mortgage Data Transfer REF When activated, the embodiment retrieves relevant data from the Cardholder Data File (42). Exceptions to this are Text information, Image, and URL data fields. Cardholders must enter this data themselves using form text fields. Mortgage Transfer Data (FIG. 20) information is not displayed in this database. The Database Option indicates whether the Transfer option is active or disabled.

The inventors expect that most cardholders will display minimal information: Public Key, embodiment email, and Mortgage Data Transfer status.

However, some users may be much more aggressive, even to the point of actively soliciting contributions from other members. Other members may just as aggressively promote the availability of unallocated credits. Public Key Status (100) also manages Changes to a Public Key (104), resulting from changes to an application (FIG. 15). The embodiment searches the Subscriber database (14), and if a proposed public key is unavailable, the user may Retry (106). Changes to the Public Key and Database Options (108) are recorded in the Cardholder database (42).

Any changes made to Public Key Status must be confirmed (78), prior to activation.

Mortgage Allocation (FIG. 10) is a function notable possible to this embodiment of the embodiment, using several unique programming instructions. The embodiment queries cardholders for three types of information:

which mortgages to credit (110);
what type of credit to perform (124); and
how to process the credit (133).

Cardholder Mortgage Data (110) is collected using an online form and stored in a Mortgage Data File (111), attached to the Cardholder Data File (42).

Mortgage Data (110) identifies type of mortgage, e.g., negatively amortizing, which can be suitable for a Sharia-compliant embodiment where interest or other consideration for lending is prohibited, but where an unpaid amount, e.g., after some period of time such as a month, is added to the principle. Sharia compliant mortgages can instigate fees such as balance service fee, transaction service fee, annual service fee. Sharia compliant mortgages can, for example, further query:
1) Diminishing musharaka principle: banks buy property, lease to client, co-own w/client, client sublets to tenant. Client's share of ownership increases over 25 yr. period. Rent charged is similar to buy-to-let mortgage.
2) Murabaha: bank buys and then sells to customer at a cost plus profit. Total cost is paid in down payment plus installments over time at no interest.
3) Ijara:"rent-to-own" bank buys property then customer makes payments to purchase over time. While making these payments, customer also leases property from bank. The rent payments may vary like in an ARM. When purchase price is paid, property is transferred to customer.
4) Declining Balance Co-ownership: bank finances purchase and co-owns with customer. Customer makes monthly payments that incrementally pay down purchase price and also include a charge for exclusive use of whole property. The incremental reductions result in an ownership transfer of that incremental portion. See, e.g., U.S patent application Ser. No. 406010, filed Apr. 3, 2003, and having Publication No. 20030233324, incorporated by reference.

Block (114) requests information about the Mortgagor: Name, Address, Phone, Fax, and Email. This routine draws on data gathered and stored in (133). If a cardholder elects to fund an Internal Mortgage (135), and supplies a valid Mortgage Account # (116), then the cardholder need enter no supplemental data in Mortgage Terms (118). If the cardholder selects an External Mortgage (136), then Mortgage Terms (118) must be completed.

Block (118) requests information about mortgage terms, including: Address of mortgaged property, amount of mortgage, due date, type of mortgage (ARM, fixed-rate, etc.), and the status of the property:
Primary residence;
2nd HomeNacation home;
Investment/income property;
Business;
Farm/Ranch; and
Other (specify);

The status (enabled/disabled) of Mortgage Transfer Authorization (43) (FIG. 3) is displayed as a checkbox. Block (120) queries the cardholder about any other mortgages s/he wishes to list. If yes, the embodiment opens a new set of information windows (114-118) to request information about Mortgagor 2, etc. This additive process continues until the cardholder states there are no further mortgages to list.

Once a cardholder has submitted his/her mortgage data (110), the embodiment begins the allocation process by generating a custom HTML page of Mortgage Allocations (124), the contents of which are diagrammed in FIG. 11, Allocation Options. The embodiment retrieves data from FIG. 11, and then queries the user (2,3,4) to specify whether Credit Allocations (126), or Direct Cardholder (128) Allocations are credited to Mortgage Principle/Closing Costs/Recurring Costs (130), or Mortgage Interest (132).

In default setting is Mortgage Principle/Closing Costs/Recurring Costs (130), the user (at 2,3,4) makes this decision for each displayed Allocation generated in FIG. 11. If Mortgage Principle/Closing Costs/Recurring Costs (130) is selected, the user then determines Payment Method (133), with Electronic Funds Transfer (EFT) to Payee (138) the default.

Payment Method (133) initiates a sub-routine to Identify Payees (134).

Specifically, the sub-routine identifies whether a target mortgage was managed by the Card issuer, referred to as an Internal Mortgagee (135), or if the mortgage is held by an Mortgagee other than the card issuer, referred to as an External Mortgagee (136). Finally, the Other Payee (137) identifier allows the cardholder to assign credit payments to third parties with whom the cardholder/homeowner incurs recurring costs, such as utility, tax, and insurance payments.

These payments are managed via a Third Party Allocation routine described in FIG. 21.

(NOTE: in some locations, mortgagee (136) may be a third entity, such as a title insurance firm performing a close.)

Optionally, cardholders may elect to receive checks (140), payable to the target Allocation Option (FIG. 11), via their monthly statement. If Mortgage Interest is selected for any of the cardholder's active Allocation Options (FIG. 11), then payment via check (140) is the only available option. [NOTE: this is due to the need to meet mortgage payment due dates, which the embodiment cannot guarantee.]

If the embodiment defaults to payment via check (140), or the user selects this option, Postage & Handling Assessments (138) may be incurred. The user is so notified at the time of his/her selection, via Confirmation of Mortgage Allocation Settings (FIG. 18), and via standard Reporting (78) (FIG. 17).

Additionally, if Mortgage Interest payment (132) is selected, the user may be allowed to deduct interest payments. In the case of a Sharia compliant mortgage, interest is not allowed but payments to rent, installment, lease, and others may be deductible. The embodiment conducts a Mortgage Deductibility Assessment (142), searching data provided by the user in (116) (FIG. 10). If allowed, the embodiment prepares IRS Form 1098 (144) annually. Mortgage Allocation is complete, pending confirmation (FIG. 18).

Turn now to FIG. 11, Allocation Options. Allocation Options (FIG. 11) manages four program processes: Allocation Options, Option Select, Allocation Format and Allocation Priority (146). In FIG. 11, each function is placed below its description. E.g.,"Credits applied" (154) (FIG. 17) is positioned under the Option Select function.

For Allocation Options, the following Allocation Options are displayed:
  a. Cardholder mortgage data (110)
  If more than one mortgage (148,150), is listed, the cardholder's Primary Residence mortgage, if specified (116), is always listed first. Otherwise, mortgages are listed in the order entered by the cardholder. Each cardholder mortgage displays the same set of available options (Option Select, 146).
  b. 2nd cardholder Contribution (160)
  2nd cardholder Contribution (160) has option (Yes/No). Default is No (164).
  c. Non-cardholder Contribution (162)
  Non-cardholder Contribution (162) has option (Yes/No). Default is No (164).
  d. Direct Contribution (180)
  Direct Contribution (180) has option (Yes/No). Default is No (182).

Option Select Choices (146) are such that for each mortgage (148, 150), the customer may choose either No Credits Applied (152), a specific amount of credits [Credits Applied (154)], or all credits [All Credits Applied (156)]. The default setting is No Credits Applied (152). If No Credits (152)

and/or Credits Applied (154) are selected for all listed mortgages (148,150), then the 2nd cardholder contribution option (160) and Non-cardholder Contribution option (162) are active and available.

If the 2nd Cardholder (160) and Non-cardholder Contribution(162) options are available, the default Option Select (146) setting is No (164), meaning credits or direct contributions are available, but have not been allocated.

If the cardholder selects All credits Applied (156) for any listed mortgage, then the 2nd Cardholder Contribution Option (164) and Non-cardholder Contribution Option (162) are inactive, and appear CEgrayed out, on the cardholder or cardholder representative computer display.

By selecting Yes (184), the Direct Contribution Option (180) overrides the All Credits Applied (156) instruction and reactivates 2nd Cardholder (160) and Non-cardholder Contribution (162) Allocation Options. Default is still set to No (164), unless or until the cardholder selects Yes (166).

Allocation Format is such that once a cardholder or cardholder representative has selected his/her options, s/he quantifies his/her credit allocations displayed under (146) Allocation Format. If No Credits Applied (152) is still applied to all options, then no quantification is possible; Allocation Format is not visible. If All Credits Applied (156) is applied to any specific mortgage, then no further quantification is possible, and Allocation Format is not visible. If Credits Applied (154) is active, the Allocation Format options are visible.

The Cardholder or representative selects a combination of Percentage Amount (170) and/or $ Amount (168) credit allocations for each listed mortgage. Percentage Amounts (170) are error-checked by the embodiment to prevent disbursements of greater than 100 percent (174).

For EXAMPLE 1: credit allocations may be a combination of percentages and fixed amounts. For example, a cardholder may elect to direct 50% of all credits to his/her primary mortgage, another 25% to a 2nd Cardholder,s mortgage, and $25 to a specific charity.

Assume the Cardholder has an available credit of $200. $100 would be directed to the primary mortgage; $50 to the 2nd Cardholder mortgage, $25 to charity, and $25 would be unapplied and retained. If the Cardholder has only $80 in available credits, $40 would go to the primary mortgage; $20 to the 2nd Cardholder, $20 to the charitable donation and no unapplied credits would remain.

In the event that credits remain unapplied (158), the embodiment invokes the Unapplied/Unawarded routine described in FIG. 16, Cardholder Credits Function.

Cardholders may choose to allow credits to accumulate in order to facilitate payment of closing costs at a later date. If 2nd Cardholder (160) and/or Non-cardholder Contribution (162) Options are available, subroutines for these processes are called by the embodiment (178) (FIG. 12) and (176) (FIG. 13). If 2nd Cardholder (160) and/or Non-cardholder Contribution (162) Options were called by activation of the Direct Contribution (180), a % Amount (170) credit allocation is disallowed. Only a $$ Amount (186) direct contribution may be entered.

In order to make a Direct Contribution (180), the cardholder or representative must specify a Frequency (188). The Cardholder or representative selects whether the Contribution will occur with each Cardholder Statement (492) (FIG. 17), or One Time Only. If the latter, the embodiment processes the Direct Contribution (180), administers due diligence, then deletes the value and resets the Direct Contribution Option (180) to No (182). If repeat Direct Contributions are specified, the embodiment processes the Direct Contribution, retains the Direct Contribution Option Settings, and via FIG. 17 (Reporting) issues the cardholder an electronic and print notification (190) with each Statement (492) (FIG. 17).

Upon issuance of the notification, the Cardholder must amend or delete the Direct Contribution within a specified time, or it will be reapplied.

Direct Contribution Target Allocations (200) is the list of available Allocation Options to which Direct contributions may be made. The embodiment retrieves data from FIGS. 10,12, and 13, allowing the cardholder or representative to select from the cardholder's mortgages, available Non-cardholders, and 2nd Cardholder mortgage pools. In the third case, search & confirmation routines may be invoked. These are described in FIG. 13 and its dependent illustrations.

With regard to Allocation Priority, the Cardholder (2) or representative (3,4) has identified all his/her proposed credit allocations. Now, s/he prioritizes these allocations at Allocation Priority (146). Direct Contributions are the equivalent of cash contributions. Consequently, there is no need to prioritize Direct Contribution Options (180). Once confirmed (FIG. 19), they are executed. Each active Allocation Option (146) is ranked by importance at Prioritize Allocations (172), with the highest priority item receiving a"1". Priority numbers are determined by the formula (NUM_OPTIONS==TOTAL_NUM_PRIORITY). For example, if there are five active Allocation Options, then the Cardholder or representative ranks the Allocation Options as 1, 2, 3, 4, or 5.

For EXAMPLE 2: In the previous EXAMPLE 1, credit allocations were assumed to be prioritized as entered: 50% toward a cardholder primary mortgage; 25% to a 2nd cardholder mortgage; $25 to charity, and any remainder as an unapplied credit. In those cases where available credits are greater than specified allocations, allocation priority is not a factor. However, in cases where available credit is less than specified allocations, Allocation Priorities can significantly affect allocations. In the prior example, we last assumed the Cardholder had only $80 in available credits. $40 was allocated to the primary mortgage; $20 to the 2nd mortgage, and $20 to charity. If the charitable donation was given top priority ("1"), the $80 of credits would be distributed: $25 to charity; **$40.00 to the primary mortgage; and $15 to the 2nd cardholder mortgage. Taken further, if $50 of credits were available, $25 would go to charity, $25 to the primary mortgage, and $0 to the 2nd Cardholder. Mortgage Pool Allocation (FIG. 12) is a sub-routine within the Allocation Options (FIG. 11) process. As described in FIG. 11 above, users may elect to award credits to non-cardholders, which may be comprised of select individuals, community groups, and charitable organizations. The intent of the embodiment is to enable users to contribute to mortgage"pools"ˆ Pool Participant Database (204), which assist lower-income, disadvantaged, handicapped, first-time, or other qualifying potential homebuyers, efforts to secure a mortgage. While this is the intent, it is not a rigorous standard. Any worthy charity or group may be selected for inclusion (206-212).

The user may elect to award to credits to as many available choices as s/he desires. The value of the awards (214-220) may also vary. Again, the user has the option of specifying Credit Allocations (136) and/or Direct Cardholder Allocations (128) stated in FIG. 11 Allocation Options, to his or her Mortgage Pool Allocation (222).

The embodiment then queries Payment Method (133): whether to deliver the allocations via EFT, or as a check(s) sent to the cardholder via his/her statement and addressed to the pool recipient(s) (206-212). In the latter case, a Postage &

Handling Assessment (138) may be executed, as the inventors anticipate that licensees may seek to discourage CEhard copy, disbursements.

The cardholder selections are confirmed (78). If annual charitable contributions exceed $75, the embodiment delivers an online and printed statement of the value of the donations per IRS guidelines (438). (See Reporting, FIG. 17).

Turning now to 2nd Cardholder Mortgage Allocation (FIG. 13), there is shown a process whereby a Cardholder may direct credit awards to any other Cardholder and to any number of Cardholders. All cardholders theoretically may be 2nd Cardholder Mortgage Allocation recipients as well as primary cardholder contributors.

Critical to 2nd Cardholder Mortgage Allocation is the Public Key, described in FIGS. 9 and 19. A cardholder maintains (at FIG. 9) either a Published (98) or an Unpublished Public Key (96). The degree of information displayed in the Public Key Database (102) also may be controlled by the cardholder. The cardholder further is able to manage the degree of information and control s/he wishes to display or allow (FIG. 14) when contributing to a 2nd Cardholder.

The process begins by a user activating the 2nd Cardholder Option in FIG. 11 (166). The 2nd Cardholder Allocation is executed as a sub-routine of FIG. 11. Gathering 2nd Cardholder Data (440) can involve several steps.

Restrictions (441) is a sub-routine described in FIG. 14. Settings from FIG. 14 are parsed here (441). Public Key Search (442) is a tool to locate any cardholder's Public Key. If a desired Public Key is published, the user (2, 3, 4), is linked to a display of that 2nd cardholder's Public Key database information (102), as determined in FIG. 9. If the Public Key is not known or otherwise unavailable, the user must initiate a 2nd Cardholder Public Key Authorization Request (FIG. 19, 446). This process is repeated for each additional non-primary cardholder mortgage (444). At this point, the embodiment reiterates the process described in FIG. 10, Mortgage Allocation. The user (2, 3, 4) allocates credits and/or direct cardholder contributions (126,128) toward principle and or mortgage interest (130,132). Payment method (134,136, 140) is selected, and tax credits, if any, are determined (142, 144).

Selections are confirmed via (78) FIG. 18, and see 2nd Cardholder Mortgage Allocation: Restrictions (FIG. 14). FIG. 14 is the cardholder,s disclosure record. A database record is maintained at FIG. 13 (441) for each 2nd Cardholder Mortgage Allocation. E.g., the primary cardholder may choose to disclose more information to one recipient than to another.

The query options are:

Disclose cardholder name? (447)

Selecting Yes means that the 2nd cardholder Received Credits Report (496) (FIG. 17) will include the contributor's name & email information.

Disclose value/amount of contribution? (448)

Selecting yes discloses the cumulative value of the cardholder,s contribution in the Received Credits Report (FIG. 17).

Allow 2nd Cardholder to reallocate?(450)

If yes, the 2nd cardholder may use the credit contribution any allowed purpose. S/he may contribute to a non-cardholder, or pass credits to another cardholder.

Consequently, the primary cardholder may be entitled to receive tax benefits. The embodiment examines the 2nd cardholder settings and allocations (456), and issues a charitable donation form as needed (438).

Principle only? (452) pertains to the cardholder optionally specifying that contributions may be used solely to pay down the 2nd cardholder,s mortgage principle. However, if interest payments are enabled, the embodiment will query primary and 2nd cardholder settings to determine whether the either party may receive an interest tax credit (142,144).

Disclose terms? (454) optionally determines whether the above conditions are shared with the 2nd cardholder. If yes, they are disclosed in the cardholder's Received Credits Report (FIG. 17). Settings changes are confirmed via FIG. 18 (78), and turn now to Application Modification (FIG. 15).

Application Modification (FIG. 15) is the final Settings Function process. It employs well-known programming to allow cardholders to update original Card Application (FIG.2,3,4) in the event of a change in address (22), telephone (28), email (26), Mortgage Data Transfer (43), name (22), or other information (456). In the event of a change in Address (22) or Telephone (28), a new Public Key (38) will be generated reflecting the revision. The embodiment references FIG. 9 Public Key Status. Similarly, in the event the Zip Code field of an Address (22) is changed, and/or a cardholder's email (26), a new embodiment email (92) and/or email redirect (90) is generated for the user. The embodiment references FIG. 8 Email Setting. NOTE: the user may elect to continue to display his/her prior email, or elect to use the new address.

Additionally, the embodiment recognizes that certain changes to an application may require special handling. Thus, Name (22) changes for reasons other than marriage (458), and unspecified changes (456) are referred to a Customer Service (460) representative. The embodiment can be configured to initially display an"800" number for Customer Service, but live online help is within the scope of the embodiment.

The embodiment queries whether the user wishes to save other changes (462). If YES, the embodiment references FIG. 8, Confirmation of Allocations (78).

If NO, the existing page remains on screen. In order to complete Customer Service Referrals (460), the user contacts Customer Service/Telco (3).

An authorized Customer Service/Telco representative Logs In (464), then queries the cardholder and enters data (466). Any changes are confirmed (78).

In Cardholder Credits Function (FIG. 16), the Cardholder Credits Function manipulates data received from Cardholder Transactions (FIG. 5, 62), Credit Calculation (468) rates, and the Cardholder's Settings (FIG. 6 et. al.) to Pay Allocated Credits (476).

A key feature of the embodiment is its ability to discriminate between Mortgagee Credits (469), awarded by Internal (135) and External (136) Mortgagees. In order to attract business, Internal Mortgagees (135) may offer higher credit rates if a cardholder moves his/her mortgage to their institution, or waive transfer or refinance charges, or offer any other legal incentive. Conversely, External Mortgagees(136) may offer credits to cardholders who open a checking, saving, or other account, or any other legal purpose.

All such offers are set and offered behind a firewall (480), that forbids cardholder access to the Mortgagee credit-setting process. Once determined, Mortgagee Credits are transmitted via Network Systems (5) to the Credit Calculation function (468).

The embodiment takes into account whether or not Payment Terms (470) have been satisfied, and reports outcomes to FIG. 17 Reporting (478). The Cardholder Credits Function exists wholly behind a firewall (480). Cardholder Credits Function is not directly accessible by cardholders (2), Customer Service/Telco (3) or Customer Service/Mail (4) representatives.

Cardholder Transaction data (62) for the current statement period is imported from FIG. 200. Credit and Transaction Service Fee Calculations are reviewed (468) and performed to determine the total number of new credits to be awarded. This calculation may be based on any reasonable formula; e.g., 5% of a single or total purchases recorded during the current period; 1% of total purchases+10% of balance carried forward, etc.

The inventors assume that licensed versions of the embodiment may offer different Credit Calculation award structures.

Possible restrictions on payments are reviewed in Payment Terms (470). Once again, this is a formulaic review based on standards established by the embodiment and/or its licensees. For example, awarded credits may be withheld [Withheld Credits (474)], from cardholders who are behind in payments; have paid an insufficient portion of an outstanding balance; have exceeded authorized credit limits; have outstanding contested charges; etc. The embodiment may also issue a portion of awarded new credits rather than all, or no credits. A regular payment review (472) is conducted, based on either statement schedule or cardholder request. If payment is not satisfied, a balance service fee may be added and the appropriate mortgage(s) balance is increased (600) and card payment (60) is transferred.

If any credits are issued, the embodiment will Pay Allocated Credits (476) according to Cardholder Settings for the Non-Cardholder Mortgage Pool (202), Third Party Allocations (137), Cardholder Mortgage (110), Additional Cardholder Mortgages (120), and $2^{nd}$ Cardholder Mortgages (440). Credit Allocation and Mortgage Increase results are referred to FIG. 17 Reporting (478). Sharia Compliant Mortgage increases are reported to FIG. 22. Sharia Mortgage Data (110) triggers appropriate increase/decrease (601) in % ownership and beneficial interest (603) and in the mortgage structure (602). Unapplied Credits (158) ˆ that is, credits remaining after the Cardholder's Settings Allocations have been completed ˆ are also referred to FIG. 17 Reporting. Unapplied Credits (158), along with Withheld Credits (474), are reviewed for possible Credit Interest Calculation (476).

This is a variable formulaic process wherein the embodiment and/or its licensees may award additional credits to unallocated credit caches. The process functions as a CEsavings account, for the cardholder.

Any legal formulaic calculation is allowed. For example, a licensee may choose to award 1 additional credit for every 100 unapplied credits. Or, a licensee may choose to allow a cardholder to apply unapplied credits to his or her credit card Minimum Payment Due or outstanding balance.

The outcome of any Credit Interest Calculation (476) is referred to FIG. 17 Reporting. Reporting Function (FIG. 17) addresses this is the embodiments due diligence process. In brief, Reporting (FIG. 17) prepares and distributes (500) the cardholder's regular Statement (492). The Statement (492) reviews current transactions (62), the disbursement of cardholder credits (482,484,486,488), any receipt of credits from other cardholders, charitable organizations, government entities, or other third parties (496), Direct Contribution (128), and the cardholder's current Settings (FIG. 6, 498). It also includes a Forecast (490), which embodies claims 7 and 8 of the embodiment, computing a forecast for repayment of the mortgage and communicating the forecast to the cardholder.

Using Network Communications Systems (5), a cardholder (2), may review his/her Online Statement (502) using a Data Input Screen (1). The Cardholder may access Cardholder Settings (FIG. 6), but further access to the Reporting Function by the cardholder is barred by firewall (480).

Similarly, transaction data (62) is transmitted to the Central Processor (7), but further access is prohibited by firewall (480). [The inventors presume that third party transaction data will be transmitted to the embodiment by a TCP/IP-enabled Electronic Data Interface (EDI) system.

The following credits and debits are reported:

For Sharia mortgages, applied increases and decreases (601) in % ownership and beneficial interest (602) and in mortgage structure (602).

Any increases and decreases in negative amortization field and mortgage payment fields (110), (120).

Pending Credits, which are retrieved from the FIG. 16 Credit Calculation.

Pending Credits (482) represent the maximum number of new credits a cardmember has earned, including withheld credits (604);

Available Credits (484) is the sum of [Pending Credits (482)] +[Unapplied Credits (158)]—[withheld credits (474)];

Invested Credits (486) details the cardholder's total credit allocations (FIG. 16) for the reporting period;

Cleared Credits (488) details cardholder credit allocations that were applied by the recipient(s) during the reporting period;

Direct Contributions (128) details the cardholder's total direct contributions (FIG. 16) for the reporting period;

Received Credits (496) details credits received by the cardholder from other cardholders;

All reported information is recorded in the Cardholder Data File (42). Additionally, this information is employed by the embodiment to prepare the cardholder's mortgage forecast (490).

The Cardholder Data File (42) for the reporting period is included in the Cardholder Statement (492), which also contains transaction (62) data and cardholder payment (60) information supplied by the provisioner. The Statement also includes the Forecast (490), and Cardholder Settings (FIG. 6, 498). These relationships are shown as dotted lines for clarity purposes; in fact, all data is already stored in the Cardholder Data File (42).

The embodiment distributes the Statement (492) as both an online document (502), and a mailed statement (506). Checks, if any (504) are enclosed in the mailed statement, pursuant to claims 2 and 3, wherein the embodiment communicates a funds transfer to the cardholder, prints a check for the amount, prints a coupon with the amount for carrying out payment of the mortgage with the check, combining the check and the coupon with a statement of the card activity so as to address the envelope to the cardholder. Checks directed to a mortgage servicer satisfy claims 4 and 6 of the embodiment, wherein a funds transfer is communicated to a mortgage servicer, including printing a check for the amount, printing a coupon with the amount for carrying out payment of the mortgage with the check, and combining the check and the coupon with a statement of the card activity in an envelope so as to address the envelope to the mortgage servicer.

Focus now on Allocation Confirmation (FIG. 18) which illustrates a routine is called throughout the embodiment. Whenever a cardholder or cardholder representative changes his or her settings (FIGS. 6-15), FIG. 18 Confirmation requests confirmation of the changes. As previously described, changes to settings initiated with a computer by a cardholder (2) or a cardholder Customer Service representative (3,4) are transmitted via Network Communications Systems (5) to the embodiment's computers (7). Alterations are entered into the Cardholder Data File (42), and are flagged as pending, (518) prior to confirmation and enabling (520).

The following description utilizes reasonably common confirmation protocols. The embodiment dispatches a confirmation email to the cardholder embodiment email and email redirect (508). The confirmation email details each proposed alteration and requests that the cardholder reject or confirm the changes (510). The response mechanism (510) is an online form field containing the following:

The embodiment displays each proposed change, with a Yes and No checkbox beside each. The cardmember approves or rejects. The embodiment displays a text field for the Public Code of the cardholder, and the Cardholder Password. The user (2,3,4) enters the Public Code and Password, which the embodiment checks against the cardholder data file (42).

If either entry is incorrect, the embodiment prompts the cardholder or representative to try again. If a correct entry cannot be made, the embodiment characterizes the attempt as equivalent to "no response".

If the cardholder responds "reject", the proposed alterations are discarded (512).

If the cardholder authorizes the changes (514), the settings are enabled.

If no response is given, i.e., the cardholder does not respond to the confirming email a second attempt at confirmation is made via the cardholder's subsequent Statement (492).

The statement form request (522) is similar to the online version offered in (510). The statement form (522) offers the cardholder three confirmation methods: via email, telco, and statement. If the cardholder opts to confirm using his/her statement, his/her signature replaces the Public Key and Password as confirmation. If no response is forthcoming, of if the changes are rejected, the proposed alterations are discarded (512).

If approved, the settings alterations are enabled (514) and recorded in the Cardholder Data File (42).

Public Key Authorization Request (FIG. 19) illustrates the concept of mortgage pooling (FIG. 10, 440) is unique to the embodiment. As previously described, cardholders exercise absolute control over the personal information they choose to display in the Public Key database (102), and also the amount of information and control they wish to provide recipients of credits (FIG. 14).

The degree of cardholder control ranges from aggressively promoting the need for or availability of credits, to revealing no information whatsoever, Public Key included. The embodiment therefore must allow for a wide range of Public Key disclosure.

The Authorization Requests begins with a cardholder identifying the Public Key of another cardholder (524). If the Public Key of a 2nd cardholder is unknown, the cardholder searches the Public Key Database (102), which may be searched by any of the criteria listed in FIG. 9, Database Options (108).

In all searches the central processor (7) confirms the existence of a Public key (540) before proceeding.

If the Public Key is unpublished (96), the embodiment will generate a Public Key Disclosure Request (526), which is relayed via email through Network Communications Systems (5) to the 2nd cardholder's data terminal (528).

For this communication to take place, the cardholder (2) must know the $2^{nd}$ cardholder's embodiment email. If the 2nd cardholder refuses to provide his or her Public Key to the cardholder and thus rejects the credit offer (530), then the embodiment dispatches an email to the cardholder so stating (532).

As an EXAMPLE, assume that parents seeking to contribute to a child,s mortgage will telephone the child to request the Public Key, or embodiment email. In other instances, a cardholder may only list his/her email in Database Options (108), thus involving all cardholders in submitting a respective formal request for the Public Key.

If the 2nd cardholder (528) agrees to provide his/her Public Key, the embodiment dispatches an email to the cardholder so stating, including the Public Key ID (534). The embodiment Central Processor (7) transmits the Public Key to the cardholder (2) via Network Systems (5). The cardholder (or representative) now is able to offer a mortgage contribution to the $2^{nd}$ cardholder (528). The offer is passed via Network (5) to the 2nd cardholder, who either accepts (536) or rejects (542) the proposed contribution. The Network (5) transmits the outcome to the embodiment Central Processor (7).

Upon acceptance, the embodiment generates an acceptance email (538), which is forwarded to the cardholder (2). Upon rejection, a rejection email (546) is dispatched to the cardholder (2).

In either case, the cardholder and 2nd cardholder data files (42) are updated to incorporate allocation changes, if any. Settings (FIG. 6-15), Credit Allocations (FIG. 16), are modified to reflect any changes. The embodiment exercises due diligence and conveys the authorization request and its outcome to FIG. 17 reporting.

Turn now to Auction Management (FIG. 20) wherein an Auction Management process is illustrated. In brief, data gathering authorized by the cardholder is made available to lending companies willing to compete for the cardholder's mortgage account, with an object of lowering a cardholder's ongoing mortgage costs. The process incorporates the methods of 2nd Cardholder Mortgage Allocations (FIG. 13), Mortgage Pool Allocations (FIG. 12), 2nd Cardholder Restrictions (FIG. 14), Public Key generation (FIG. 9), and Public Key Authorization (FIG. 19).

This process is enabled whenever a cardholder authorizes a Mortgage Data Transfer from his or her mortgage provisioner (FIG. 3, 43). The embodiment Central Processor (7), drawing on mortgagee data supplied by the cardholder (2) and stored in the Cardholder Data File (42), initiates a Network (5) request to the mortgagee for the transfer of the cardholder's mortgage data (6).

Retrieved Mortgagor Mortgage Data (6) is stored in a sub-directory of the Cardholder Data File's (42) Cardholder Mortgage Data File (111), called the Cardholder Mortgage E-file (550). This sub-directory is separated by firewall (480) from the balance of the Cardholder Data File. Each Cardholder Data File is stored within the comprehensive Subscriber Database (14).

Other mortgage lenders may now query the Subscriber Database's (14) Cardholder Mortgage E-Files (550). And, if so determined, tender a Mortgage Lender Tender Offer (554) via network communication systems (5) to any participating Cardholder Data Terminal (2).

The rationale for lenders to participate in the Auction is discussed in the Objects of the Embodiment. The inventors anticipate that the Auction will be a highly desirable tool for both lenders and consumers. To that end, the embodiment anticipates establishing Lender Terms (572), wherein the embodiment and/or its licensees may potentially involve any lender who tenders an offer must agree to make its own lender pool data available to the embodiment.

Once an offer has been tendered, the cardholder may Reject (568) the offer; Counter (556), or accept the proposed mortgage (558). In the first case, the Central Processor (7) dispatches a rejection email (570) to the mortgage lender. In the case of a counter, the cardholder directly sends a counter email (556) to the mortgage lender, who may or may not enter into further negotiations (562) with the cardholder (2). Finally, if an offer is accepted, the Central Processor dispatches an Acceptance email (566) to the selected lender (560), which Negotiates (562) with the cardholder (2).

In the event of a successful transaction, the embodiment Central Processor (7) computes and assesses any Enabling Fees (564) chargeable to the Selected Lender (560) or cardholder (2). These fees are formulaic in nature, and may be either a fixed fee, a commission, or nothing. Negotiated fees, i.e., negotiated on a case-by-case basis ^ are also possible, based on the discretion of the inventors and licensees.

If an Auction is successful, the Central Process (7) updates numerous functions, including the Application (FIG. 2 and 15), Mortgage Allocations (FIGS. 10 and 11), email and Public Key (FIGS. 8 and 9), and the Crediting and Reporting functions (FIGS. 16 and 17).

Turning to FIG. 21, which manages the allocation of credits to Third Party payees such as insurance, tax, and other entities described herein. Third party payees are stored within a Third-Party Allocation File (580) unique to each cardholder account. Each cardholder file is part of a universal Third Party Master Allocation File Master (594), protected by a Firewall (480) from access by individual cardholders. The process of allocating credits to Third Parties is like that used for other forms of allocations. The cardholder enters a Payee Name and Account # (582), the amount of the Credit Allocation (126), the Frequency (584) of the allocation [Note: a one-time allocation is the default; the cardholder may change this setting to 'recurring.'] The cardholder also may authorize that additional monies be paid directly from his or her card by entering a total contribution amount in Direct Cardholder Contributions (588). [NOTE: because of the inherently variable nature of earned credits, the inventors assume that many cardholders will opt to specify a total amount of contributions to be paid each month for available Third Party Allocations, comprised of earned credit contributions plus additional funds paid via the card.]

Once this data has been entered by the cardholder, the embodiment searches the Third Party Allocation File Master (594) to determine if payment protocols for each specific third party allocation already exist. If the third party data already exists, the cardholder confirms the Payee Data Record (586) and proceeds to select a Payment Method (133). If data is not available, or is erroneous, the cardholder proceeds to Payee Account Information (590), including mailing address, contact information, and other such data as may be used to deliver payment promptly and properly.

Once the cardholder has entered this information, the embodiment determines whether payment may be made via an Availability Review (592). The inventors anticipate that completion of the may not always be possible to conduct without human intervention. Some Third Party payees may not have EFT capability; may refuse to accept credit card payment;

may refuse to accept partial payment, etc. Consequently, the process of reviewing and authorizing payments may not always be instantaneous, and may sometimes result in a denial of service. Additionally, the P&H Assessments may be levied (139).

For third party vendors able to participate in this payment system, the user now selects Payment Method (133), either an Electronic Funds Transfer (EFT) (138), or a check to the payee, sent via the monthly statement to the cardholder (140).

This selection process is repeated for each Third Party payee.

Allocation Settings (78) are confirmed. The Mortgage Data File (111) and the Cardholder Data File (42) are updated as needed. Reporting (13) information is updated, and the Cardholder Credits Function (12) is updated.

Consider now an embodiment viable in its own right that happens to also be representative or a Sharia-compliant approach.

Illustrative (not intended to be limiting by a representative teaching) is a Shariah-compliant charge card (SCCC) linked to a mortgage has previously eluded those in finance, but solutions are hereby proposed. A consumer who has a mortgage or is getting a mortgage uses the SCCC. Each transaction generates a fee, let's call it a "guarantee fee" of a variable amount, and for illustration purposes let's say it is 6% of the purchase price. On a $100 purchase, the total cost becomes $106, and repayment can be structured over a specified time frame, say 12 months. In this instance, the consumer will pay $106/12 monthly for one year. If scheduled payments are not made on time, the late payment amount will transfer to a mortgage balance.

As payments of the late payment amount are made, that amount will be deducted from a mortgage balance. Another method for incentivizing payments is to have the consumer donate to a charity and the embodiment makes provisions for this. Other forms mortgages, such as construction loans and home equity loans, can also be linked to a credit card. Other assets can also be linked to the credit card like automobiles and equipment. Debt instruments or liens can be used to provide security for purchases.

An improvement upon these Shariah compliant scenarios is to add an optional rewards feature that rewards card usage and may possibly reward timely payments. Each purchase transaction can generate a reward that reduces the mortgage (or debt or lien) balance. Timely and even early payments can also generate rewards that reduce the mortgage balance but these rewards cannot be a condition for earlier payment and the card issuer must give these rewards voluntarily. Therefore, card usage and timely payments can reduce a mortgage balance and late or missing payments can increase a mortgage balance.

Other assets may also be used to guarantee the debt such as autos or equipment. In these cases, instead of or even in concert with a mortgage, unpaid or late credit card debt can be liened on other assets.

A Shariah compliant credit card can assist with monitoring transactions to restrict the purchase of unlawful goods and services, and to assure that card usage is for the real sale of some commodities and not just the advancement of a loan to pay salaries, electric bills, other loans, etc.

The rewards and late payments that can flow into and out of the mortgage can be credited or debited from any of the various parts of a mortgage payment or combination thereof: those parts are principal, interest, taxes, and various forms of insurance although interest would not be present in a Shari'ah compliant mortgage. If no mortgage exists on a property, liens can be recorded and, since no mortgage exists, taxes and insurance can be paid using rewards or increased if there are payment problems. A similar situation exists when other assets are being liened in terms which part of the debt payment is credited or debited and the potential for liens if the assets don't carry debt.

The rewards currency can vary: cash or cash equivalents, credits, reward certificates, rebates, and points. Rewards can also be earned through patronization of acceptable entities such as businesses, unions, and other groups or coalitions of entities. This will allow the potential for greater rewards and increased patronization of certain entities. For example, when purchasing a house, the consumer could receive a bundle of rewards from realtors, title companies, lenders, appraisers, attorneys, credit companies, house inspectors, insurers, builders and developers, building materials companies, unions, contractors transportation companies, government or quasi-government entities, etc. In this instance, the rewards could be used for more than reducing the mortgage: downpayment, various fees, upgrades, land purchase, and various other costs associated with a home purchase and construction. These entities and their practices could be screened for compliance with Islamic Laws and practices.

Embodiments herein encompass an improved digital electrical computer-based system: a machine (programmed computer), methods for making and using it, products produced by the method, articles, data structures, and necessary intermediates, collectively referenced herein after as the method (for the sake of brevity). Accordingly the embodiment can be exemplified as a computer-aided method such as that for card (bank, credit, debit, or the like) activity-based mortgage crediting. More particularly, the foregoing can be carried out by steps including: associating card activity with a mortgage of a cardholder; crediting an amount to the mortgage responsive to the card activity; and generating output including the charge card activity-based mortgage crediting; wherein at least some of the steps are carried out by a digital electrical computer.

In any of the embodiments, the method can be carried out further including the step of: using a second computer to compute a valuation of a mortgage-backed security in response to indicia of said crediting or debiting.

In any of the embodiments, the method can be carried out further including the step of: executing an agreement between customer, card issuer, and mortgage servicer for adding an amount to a mortgage.

In any of the embodiments, the method can be carried out further including the step of: executing an agreement between mortgage servicer and investor for adding an amount to a mortgage.

In any of the embodiments, the method can be carried out further including the step of: executing an agreement between customer and card issuer to have unpaid balances paid by a mortgage.

In any of the embodiments, the method can be carried out further including the step of: executing an agreement between customer and mortgage servicer to pay unpaid card balances with proceeds derived from a mortgage and add that balance to the mortgage.

In any of the embodiments, the method can be carried out further including the step of: executing agreements between parties reflective of state and country and treaty specific laws.

In any of the embodiments, the method can be carried out further including the step of: adding a balance service fee to the card balance for unpaid balances when payment is due.

In any of the embodiments, the method can be carried out further including the step of: adding an annual service fee to the card balance.

In any of the embodiments, the method can be carried out further including the step of: in the case of a Shari'ah compliant card, adding a transaction service fee, say 5% of the transaction amount, to the card balance.

In any of the embodiments, the method can be carried out further including the step of: periodically adding an amount to a first mortgage as exemplified by a negative amortization mortgage but adapted to include an unpaid card payment amount.

In any of the embodiments, the method can be carried out further including the step of: adding an amount to first mortgage principal, purchase price amount, interest, taxes, insurance, installment, rent, lease or fee payment In any of the embodiments, the method can be carried out further including the step of in the case of a Sharia compliant first mortgage, not adding an amount to interest.

In any of the embodiments, the method can be carried out further including the step of: in the case of a Sharia compliant mortgage, reducing and increasing ownership amounts of the co-owners and shareholders reflective of an increase in mortgage balance.

In any of the embodiments, the method can be carried out further including the step of: transferring funds to pay unpaid card balance.

In any of the embodiments, the method can be carried out further including the step of: periodically adding an amount to a second mortgage as exemplified by a negative amortization mortgage but adapted to include an unpaid card payment amount.

In any of the embodiments, the method can be carried out further including the step of: adding an amount to a second mortgage principal, purchase price amount, interest, taxes, insurance, installment, rent, lease or fee payment.

In any of the embodiments, the method can be carried out further including the step of: in the case of a Sharia compliant second mortgage, not adding an amount to interest.

In any of the embodiments, the method can be carried out further including the step of: creating secondary market investment vehicles for cards and first mortgages linked in order to pay card balances with a mortgage.

In any of the embodiments, the method can be carried out including the steps of:

activating a Shari'ah compliant mortgage with fungible balances.

In any of the embodiments, the method can be carried out including the steps of: communicating an increase in a mortgage balance in response to a late or missing payment.

In any of the embodiments, the method can be carried out including the steps of:

communicating an increase in an asset debt balance in response to a late or missing payment.

In any of the embodiments, the method can be carried out including the steps of:

communicating an increase in a lien in response to a late or missing payment.

In any of the embodiments, the method can be carried out including the steps of: creating a lien in response to a late or missing payment.

In any of the embodiments, the method can be carried out including the steps of: calculating reward amount in response to card payment activity and crediting an optional amount to a mortgage.

In any of the embodiments, the method can be carried out including the steps of: calculating reward amount in response to card payment activity and crediting an optional amount to a lien.

In any of the embodiments, the method can be carried out including the steps of: monitor card purchases for Sharah compliance.

The method of the embodiment also is applicable to other significant homeowner expenses, such as: payment and management of health care expenses, including doctor's visits, prescription costs, hospital expenses, and preventive care; insurance premiums, co-payments and deductible expenses; planning for and provision of elder care, including nursing and assisted living expenses, senior center and wellness programs; credits toward long-term care, including premium payments, medical expenses, equipment costs, hotel, hospice, and home care expenses, and prescription and other treatment payments; contributing toward day care costs; contributing toward a college fund, or directly to college tuition and room and board; contributing toward wedding costs, including formal wear purchases and rental, flowers and decoration, banquet, and direct contributions to bridal/marriage registries, and; contributing toward funeral costs, including burial and cremation costs, shipping and transport, applicable death taxes, and contributing toward a probate fund or payment of probate taxes to any authorized party.

Although only a few exemplary embodiments have been described in detail above, those skilled in the art will readily appreciate that many modifications are possible in the exemplary embodiments without materially from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

I claim:

1. An apparatus including:
   a first computer system, enabling a debit to be incurred in connection with usage of a credit or charge card, that communicates, responsive to a late or missing credit or charge card debt payment, with
   a second computer system enabling a mortgage, configured to carry out the steps of applying an amount that is late or missing for the payment to increase a balance on the mortgage, and generating output showing the amount applied to the mortgage balance;
   wherein the mortgage is of a type that consideration for lending for the mortgage is prohibited.

2. The apparatus of claim 1, wherein the credit or charge card is a credit card.

3. The apparatus of claim 1, wherein the credit or charge card is a charge card.

4. The apparatus of claim 1, wherein the mortgage is a first mortgage.

5. The apparatus of claim 1, wherein the mortgage is a second mortgage.

6. The apparatus of claim 1, wherein the consideration is interest.

7. The apparatus of claim 6, wherein the computers cooperate to compute a valuation of a mortgage-backed security for the mortgage.

8. An apparatus including:
   a computer system applying, responsive to a late or missing credit or charge card debt payment, the debt incurred in connection with usage of a credit or charge card, an amount that is late or missing for the payment to a real estate mortgage to increase a balance on the mortgage, and generating output showing the amount applied to the balance;
   wherein the mortgage is of a type that consideration for lending for the mortgage is prohibited.

9. The apparatus of claim 8, wherein the mortgage is a first mortgage.

10. The apparatus of claim 8, wherein the mortgage is a second mortgage.

11. The apparatus of claim 8, wherein the consideration is interest.

12. The apparatus of claim 11, wherein one of the computers enables computing a valuation of a mortgage-backed security for the mortgage.

13. The apparatus of claim 8, wherein the computer system includes a computer which computes a valuation of a mortgage-backed security for the mortgage.

14. An apparatus including:
   computers cooperating responsive to a late or missing credit or charge card debt payment the debt incurred in connection with usage of a credit or charge card, to receive information in memory and to process the information to produce output showing an amount that is late or missing for the payment applied to increase a balance of a real estate mortgage;
   wherein the mortgage is of a type that consideration for lending for the mortgage is prohibited.

15. The apparatus of claim 14, wherein the mortgage is a first mortgage.

16. The apparatus of claim 14, wherein the consideration is interest.

17. The apparatus of claim 14, wherein one of the computers enables computing a valuation of a mortgage-backed security for the mortgage.

18. A non-transitory computer-readable media tangibly embodying program instructions executable by a processor to cause a computer to carry out the operations of:
   applying, responsive to a late or missing credit or charge card debt payment, the debt incurred in connection with usage of a credit or charge card, an amount that is late or missing for the payment to a real estate mortgage so as to increase a balance on the mortgage, and
   generating output showing the amount applied to the balance;
   wherein the mortgage is of a type that consideration for lending for the mortgage is prohibited.

19. The computer-readable media of claim 18, wherein the media comprises at least one of a RAM, a ROM, A disk, an ASIC, and a PROM.

20. The computer-readable media of claim 18, wherein the consideration is interest.

* * * * *